US012764497B2

(12) United States Patent
Hanson et al.

(10) Patent No.: US 12,764,497 B2
(45) Date of Patent: Oct. 13, 2026

(54) SYSTEMS AND METHODS FOR IDENTIFYING AND REPORTING LOCATION INFORMATION FOR A MONITORED INDIVIDUAL

(71) Applicant: BI Incorporated, Boulder, CO (US)

(72) Inventors: Duke Hanson, Boulder, CO (US); Todd Bischoff, Boulder, CO (US)

(73) Assignee: BI Incorporated, Boulder, CO (US)

( * ) Notice: Subject to any disclaimer, the term of this patent is extended or adjusted under 35 U.S.C. 154(b) by 271 days.

(21) Appl. No.: 18/594,284

(22) Filed: Mar. 4, 2024

(65) Prior Publication Data

US 2024/0298148 A1 Sep. 5, 2024

Related U.S. Application Data

(60) Provisional application No. 63/449,923, filed on Mar. 3, 2023.

(51) Int. Cl.
*H04W 4/029* (2018.01)
*G01S 19/01* (2010.01)

(52) U.S. Cl.
CPC ............. *H04W 4/029* (2018.02); *G01S 19/01* (2013.01)

(58) Field of Classification Search
CPC ....... H04W 48/18; H04W 4/02; H04W 84/06; H04W 92/18; H04W 4/50; H04W 4/80; H04W 88/085; H04W 48/20; H04W 4/24; H04W 24/02; H04W 8/12; H04W 4/029; G01S 19/01; G01S 5/0263; G01S 5/0268; G01S 5/0027; G01S 5/012; G01S 5/019; G01S 19/48

See application file for complete search history.

(56) References Cited

U.S. PATENT DOCUMENTS

| | | | | |
|---|---|---|---|---|
| 7,330,122 | B2 * | 2/2008 | Derrick | G01S 5/002 |
| 2002/0089434 | A1 * | 7/2002 | Ghazarian | G08B 13/06 |
| 2007/0037582 | A1 * | 2/2007 | Mohi | H04W 4/029 455/456.1 |
| 2014/0293059 | A1 * | 10/2014 | Park | H04W 4/02 348/158 |
| 2017/0270778 | A1 * | 9/2017 | Melton | G08B 21/028 |
| 2022/0061680 | A1 * | 3/2022 | Hanson | H04W 4/029 |
| 2023/0140086 | A1 * | 5/2023 | Wang | H04W 4/02 455/456.1 |
| 2024/0077568 | A1 * | 3/2024 | Duan | G01S 5/0027 |
| 2024/0373192 | A1 * | 11/2024 | Cattermole | H04W 4/80 |
| 2025/0280268 | A1 * | 9/2025 | Cattermole | H04W 4/80 |

* cited by examiner

*Primary Examiner* — Lana N Le
(74) *Attorney, Agent, or Firm* — Osha Bergman Watanabe & Burton LLP

(57) ABSTRACT

Various embodiments provide systems and methods for selecting one of a number of location determination services supported by a monitoring system. The monitoring system may include a user attached monitor device configured to support a first subset of the location determination services and a user detached monitor device configured to support a second subset of the location determination services. In other cases, the monitoring system may include only a user attached monitor device or a user detached monitor device.

20 Claims, 14 Drawing Sheets

SYSTEMS AND METHODS FOR IDENTIFYING AND REPORTING LOCATION INFORMATION FOR A MONITORED INDIVIDUAL

CROSS REFERENCE TO RELATED APPLICATIONS

The present application claims priority to (is a non-provisional application of) U.S. Pat. App. No. 63/449,923 entitled "Systems and Methods for Determining a Primary Source of Location Tracking", and filed Mar. 3, 2023 by Hanson et al. The entirety of the aforementioned reference is incorporated herein by reference for all purposes.

BACKGROUND OF THE INVENTION

Various embodiments provide systems and methods for selecting one of a number of location determination services to provide a location of a monitored individual.

Tracking devices have been attached to monitored individuals and provide an ability to automatically determine the location of the respective monitored individual. Such tracking devices can include, for example, location determination circuitry. Such location determination circuitry depends upon, for example, signal reception from location satellites, WiFi devices, and/or transmitting beacons. Each of these types of location services use differing levels of power to establish a location of a tracking device. Where power is depleted to a defined extent or the device is manipulated, such location determination circuitry can operate improperly causing a loss of location information from the tracking device.

Thus, for at least the aforementioned reasons, there exists a need in the art for more advanced approaches, devices and systems for detecting monitored individual location.

BRIEF SUMMARY OF THE INVENTION

Various embodiments provide systems and methods for selecting one of a number of location determination services to provide a location of a monitored individual.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
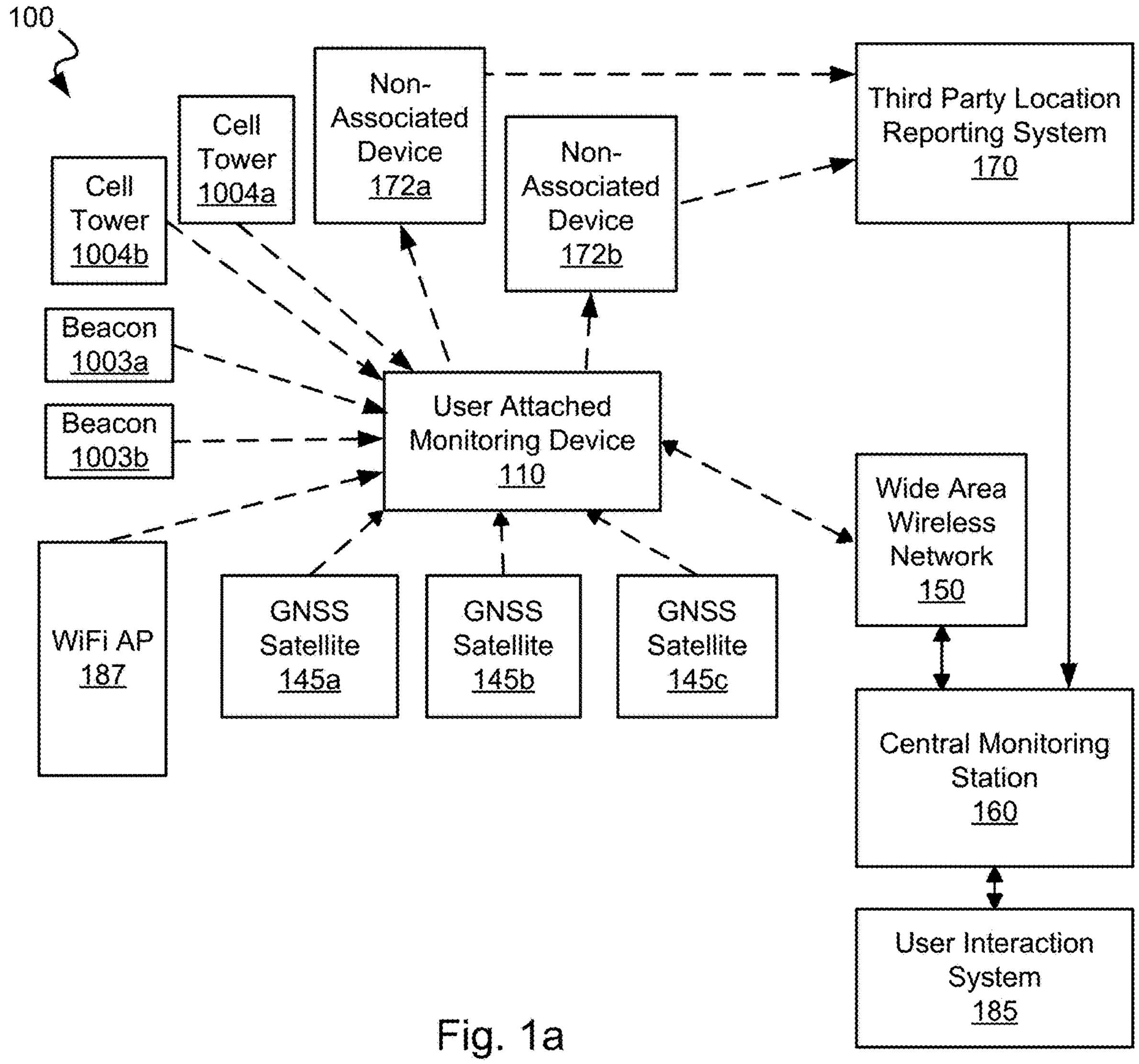
FIGS. 1*a*-1*d* are block diagrams illustrating a location monitoring system a location monitoring system that includes a user attached monitoring device configured for selection of one of a number of location determination services supported by the user attached monitor device in accordance with some embodiments.

Various embodiments provide systems and methods for selecting one of a number of location determination services to provide a location of a monitored individual.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "cell" includes reference to one or more of such cells.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the elements shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

As used herein, the term "non-associated device" means any device that is not controlled by a monitoring device or an individual associated with the monitoring device and capable of transmitting its location information to a third-party location reporting system. Such a third-party location reporting system may be a crowd sourced location system as are known in the art. As an example, a third-party location reporting system may be the crowd sourced location system provided by Apple™. Non-associated devices may be, but are not limited to, mobile telephones, smart watches, or the like that are registered to provide location information to a third-party location reporting system. Based upon the disclosure provided herein, one of ordinary skill in the art will recognize a variety of devices that may be used as non-associated devices, and a variety of systems that may include both non-associated devices and a third-party reporting system used for identifying the location of a monitoring device that has provided identifications to one or more non-associated devices.

Various embodiments provide methods for selecting a location source for tracking a monitored individual. Such methods may include identifying, by a processing resource, a plurality of location determination services supported by an individual monitoring system. The individual monitoring system includes at least one of a user attached monitor device and a user detached monitor device. The plurality of location determination services include at least two of: a satellite location determination service of the user attached monitor device, a satellite location determination service of the user detached monitor device, a beacon based location determination service of the user attached monitor device, a cell tower based location determination service of the user attached monitor device, a cell tower based location determination service of the user detached monitor device, a non-associated device based location determination service of the user attached monitor device, and/or a non-associated device based location determination service of the user detached monitor device.

The methods may further include selecting, by the processing resource, one of the plurality of location determination services. The selection is made based at least in part upon a combination of two or more of: a location of the user attached monitor device, a location of the user detached monitor device, a power status of the user attached monitor device, a power status of the user detached monitor device; a cost of the satellite location determination service of the user attached monitor device, a cost of the satellite location determination service of the user detached monitor device, a cost of the beacon based location determination service of the user attached monitor device, a cost of the cell tower based location determination service of the user attached monitor device, a cost of the cell tower based location determination service of the user detached monitor device, a cost of the non-associated device based location determination service of the user attached monitor device, a cost of the non-associated device based location determination service of the user detached monitor device, an accuracy of the satellite location determination service of the user attached monitor device, an accuracy of the satellite location determination service of the user detached monitor device, an accuracy of the beacon based location determination service of the user attached monitor device, an accuracy of the cell tower based location determination service of the user attached monitor device, an accuracy of the cell tower based location determination service of the user detached monitor device an accuracy of the non-associated device based location determination service of the user attached monitor device, and an accuracy of the non-associated device based location determination service of the user detached monitor device. The methods may further include, receiving location information from the selected one of the plurality of location determination services; and reporting the location information to a central monitoring station via a wireless communication link.

Other embodiments provide monitoring systems. Such monitoring systems may include a user attached monitor device that is configured to support a plurality of location determination services. The plurality of location determination services includes two or more of: a satellite location determination service of the user attached monitor device, a beacon based location determination service of the user attached monitor device, a cell tower based location determination service of the user attached monitor device, and/or a non-associated device based location determination service of the user attached monitor device. The user attached monitor device comprises a processor communicably coupled to a computer readable medium. The computer readable medium has stored therein, instructions which, when executed by the processor, cause the processor to: select one of the plurality of location determination services based at least in part upon a combination of two or more of: a location of the user attached monitor device, a location of a user detached monitor device, a power status of the user attached monitor device, a power status of a user detached monitor device; a cost of the satellite location determination service of the user attached monitor device, a cost of the satellite location determination service of the user detached monitor device, a cost of the beacon based location determination service of the user attached monitor device, a cost of the cell tower based location determination service of the user attached monitor device, a cost of the cell tower based location determination service of the user detached monitor device, a cost of the non-associated device based location determination service of the user attached monitor device, a cost of the non-associated device based location determination service of the user detached monitor device, an accuracy of the satellite location determination service of the user attached monitor device, an accuracy of the satellite location determination service of the user detached monitor device, an accuracy of the beacon based location determination service of the user attached monitor device, an accuracy of the cell tower based location determination service of the user attached monitor device, an accuracy of the cell tower based location determination service of the user detached monitor device an accuracy of the non-associated device based location determination service of the user attached monitor device, and/or an accuracy of the non-associated device based location determination service of the user detached monitor device.

Turning to FIG. 1*a*, a block diagram illustrates a monitoring system 100 including a user attached monitor device 110 and a central monitoring station 160. Central monitoring station 160 is wirelessly coupled to user attached monitor device 110 via one or more wide area wireless (e.g., cellular telephone network, Internet via a WiFi access point, or the like) communication networks 150.

Central monitoring station 160 may be any location, device or system where location data and/or other types of data are received, including by way of non-limiting example: a cellular/smart phone, an email account, a website, a network database, and a memory device. The location data and/or other types of data are stored by central monitoring station 160 and are retrievable by a monitoring individual, such as a parent, guardian, parole officer, court liaison, spouse, friend, or other authorized group or individual. In this manner, the monitoring individual is able to respond appropriately to detected activity of a monitored individual. In some cases, the monitoring individual is able to retrieve the location data and/or other data types via a user interaction system 185 which may be, but is not limited to, a network connected user interface device communicatively coupled via a network to central monitoring station 160 and/or directly to user attached monitor device 110 via wide area wireless network 150.

Central monitoring station 160 may include a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the monitored individual in accordance with the described embodiments. In particular, the interactive web portals may enable the monitor to retrieve the location and user identification data of one or more monitored individuals, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website or mobile application accessible via a software application on a mobile device (e.g. smart phone). The mobile website may be a modified version of the server supported website with limited or additional capabilities suited for mobile location monitoring.

User attached monitor device 110 includes a location sensor or system that is capable of determining a location of user attached monitor device 110 and generates corresponding location data. For example, the location sensor or system that is capable of determining a location of user attached monitor device 110 may support a satellite based location determination service of user attached monitor device 110 that is capable of receiving wireless global navigation satellite system (hereinafter "GNSS") location information from a sufficient number of GPS or GNSS satellites 145 (i.e., one or more of GNSS satellites 145*a*, 145*b*, 145*c*) respectively. Where such a location sensor or system is available in user attached monitor device 110, user attached monitor device 110 may use the received wireless GNSS location information to calculate or otherwise determine the location of a human subject to which user attached monitor device 110 is attached. Global positioning system (hereinafter "GPS) is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone-based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS or GNSS satellites 145 via respective communication links. The location data and/or other data gathered by user attached monitor device 110 is wirelessly transmitted to central monitoring station 160 via wide area wireless network 150.

Further, the location sensor or system that is capable of determining a location of user attached monitor device 110 may include WiFi based location determination circuitry that is configured to communicate with one or more WiFi access points 187, and based thereon to determine location of user attached monitor device 110. Such use of WiFi to establish location by user attached monitor device 110 is referred to as a WiFi based location determination service of user attached monitor device 110.

Yet further, the location sensor or system that is capable of determining a location of user attached monitor device 110 may include non-associated device-based location determination circuitry that is configured to sense that one or more non-associated devices 172 (e.g., a non-associated device 172*a* and/or a non-associated device 172*b*) is/are within range of user attached monitor device 110, and to communicate (i.e., transmit) an identification of user attached monitor device 110 to the identified non-associated device. In some embodiments, the aforementioned communications are performed via BlueTooth™ or another relatively short-range, low-power communication protocol. Based upon the disclosure provided herein, one of ordinary skill in the art will recognize a variety of protocols that may be used for communications between user attached monitor device 110 and a nearby non-associated device 172. Such use of non-associated devices to establish location by user attached monitor device 110 is referred to as a non-associated device based location determination service of user attached monitor device 110.

In turn, the non-associated device that received the identification information from user attached monitor device 110 reports the identification received from user attached monitor device 110 and the location of the non-associated device to a third-party location reporting system 170. Third-party location reporting system 170 in turn transfers the received identification and location information to a recipient registered with the received identification in third-party location reporting system 170. In this case, the recipient registered with the received identification in third-party location reporting system 170 is central monitoring station 160. In such a case, a location of the non-associated device that provided the identification of user attached monitor device 110 to third-party location reporting system 170 is established by central monitoring station 160 as the location of user attached monitor device 110.

Additionally, the location sensor or system that is capable of determining a location of user attached monitor device 110 may include cell-tower based location determination circuitry that is configured to communicate with one or more cell towers 1004 (e.g., a cell tower 1004*a* and/or a cell tower 1004*b*), and based thereon to determine location of user attached monitor device 110. Such use of cell tower(s) to establish location by user attached monitor device 110 is referred to as a cell tower based location determination service of user attached monitor device 110.

Additionally, the location sensor or system that is capable of determining a location of user attached monitor device 110 may include beacon based location determination circuitry that is configured to communicate with one or more beacons 1003 (e.g., a beacon 1003*a* and/or a beacon 1003*b*), and based thereon to determine location of user attached monitor device 110. Such use of beacon(s) to establish location by user attached monitor device 110 is referred to as a beacon based location determination service of user attached monitor device 110.

Power requirements, costs (i.e., financial costs), accuracy, and availability for each of the satellite based location determination service, the WiFi based location determination service, the non-associated device based location determination service, the cell tower based location determination service, and the beacon based location determination service may be different. In some embodiments, user attached monitor device 110 and/or central monitoring station 160 may be configured to select one of the available location determination services based upon a combination of cost requirements, power requirements, accuracy requirements, and/or availability. An example embodiment of selecting one of the available location determination services of user attached monitor device 110 is discussed below in relation to FIGS. 4-5.

Figure 1B:
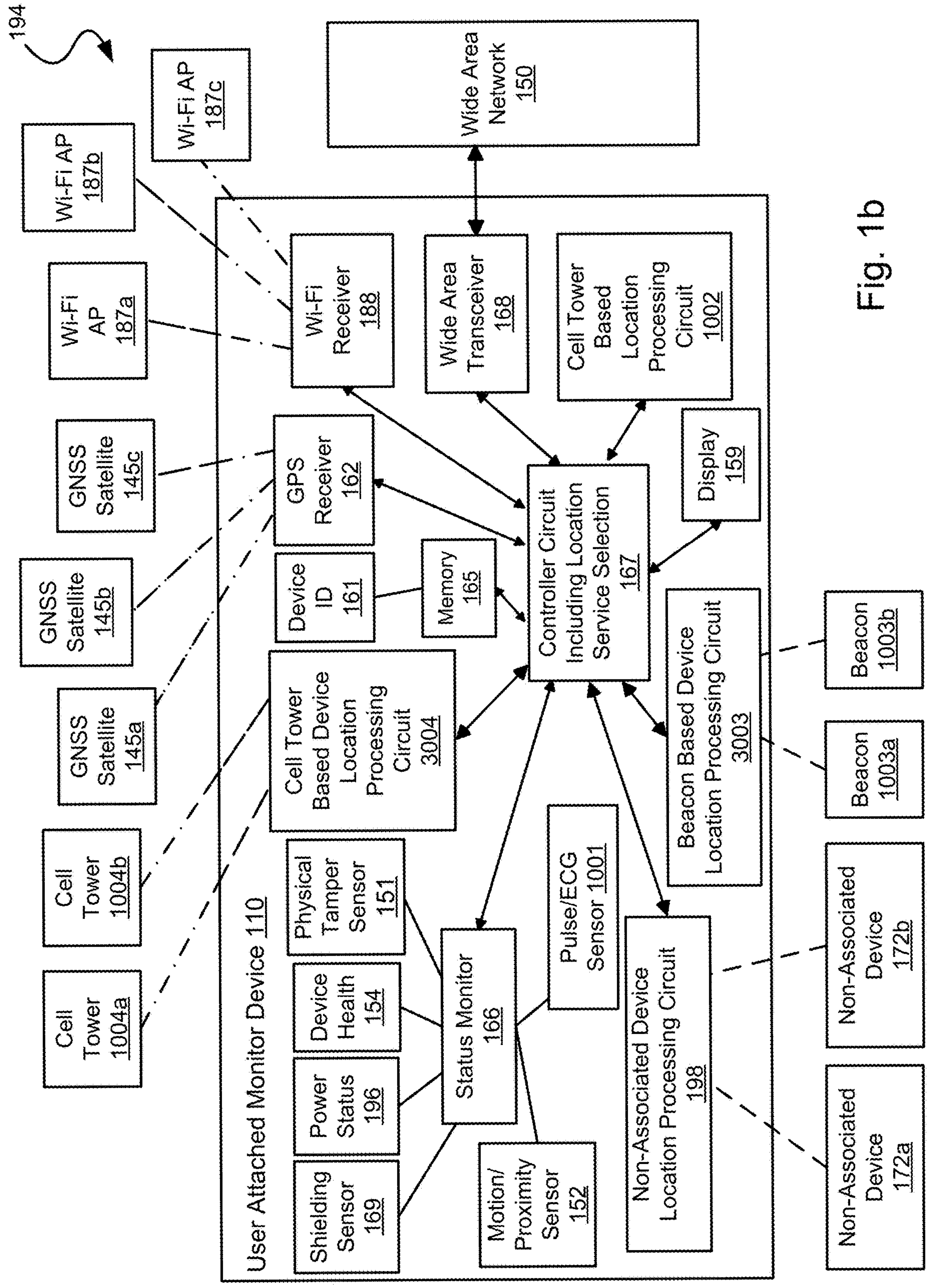

Turning to FIG. 1*b*, a block diagram 194 of user attached monitor device 110 is shown in accordance with some embodiments. As shown, user attached monitor device 110 includes a device ID 161 that may be maintained in a memory 165, and is thus accessible by a controller circuit 167. Controller circuit 167 may interact with a GPS receiver 162 (an example of a satellite based location service of user attached monitor device 110) and memory 165 at times for storing and generating records of successively determined GPS locations. Similarly, controller circuit 167 may interact with a WiFi receiver 188 (an example of a WiFi based location service of user attached monitor device 110) and memory 165 at times for storing and generating records of successively determined WiFi access point identifications and signal strength; controller circuit 167 may interact with cell tower based location processing circuit 3004 (an example of a cell tower based location service of user attached monitor device 110) and memory 165 at times for storing and generating records of successive locations determined based upon communications with cell towers 1004; controller circuit 167 may interact with beacon based location processing circuit 3003 (an example of a beacon based location service of user attached monitor device 110) and memory 165 at times for storing and generating records of successive locations determined based upon communications with beacons 1003; and controller circuit 167 interacts with a non-associated device location processing circuit 198 (an example of a non-associated device based location service of user attached monitor device 110) for causing location information to be transmitted to central monitoring station 160 via third party location reporting system 170.

In some cases, memory 165 may include instructions (e.g., software-based or firmware-based instructions) executable by controller circuit 167 to enable and disable one or more of a satellite based location service of user attached monitor device 110, a WiFi based location service of user attached monitor device 110, a cell tower based location service of user attached monitor device 110, a beacon based location service of user attached monitor device 110, and/or a non-associated device based location service of user attached monitor device 110; and to select one of the satellite based location service of user attached monitor device 110, a WiFi based location service of user attached monitor device 110, a cell tower based location service of user attached monitor device 110, a beacon based location service of user attached monitor device 110, and/or a non-associated device based location service of user attached monitor device 110. An example embodiment of selecting one of the available location determination services of user attached monitor device 110 is discussed below in relation to FIGS. 4-5.

Non-associated device location processing circuit 198 is configured to sense that one or more non-associated devices 172 is/are within range of user attached monitor device 110, and to communicate (i.e., transmit) an identification of user attached monitor device 110 to the identified non-associated device. In turn, the non-associated device that received the identification information from user attached monitor device 110 reports the identification received from user attached monitor device 110 and the location of the non-associated device to third-party location reporting system 170. Third-party location reporting system 170 in turn transfers the received identification and location information to a recipient registered with the received identification in the system. In this case, the recipient registered with the received identification in the system is central monitoring station 160. The power requirements of the user attached monitor device 110 for identifying the non-associated device and communicating the identification to the non-associated device may be substantially less than, for example, determining location based either on WiFi access points 187 or GNSS satellites 145.

The selection between the satellite based location service of user attached monitor device 110, a WiFi based location service of user attached monitor device 110, a cell tower based location service of user attached monitor device 110, a beacon based location service of user attached monitor device 110, and/or a non-associated device based location service of user attached monitor device 110 as the service to be used for determining a location of user attached monitor device 110 may use controls or default values programmable via central monitor station 160, and/or based upon conditions detected in user attached monitor device 110 with corresponding pre-determined controls or default values. For example, it may be determined whether sufficient battery power as reported by power status 196 remains in user attached monitor device 110 to support a particular position determination technology. Where insufficient power remains, using the proxy location by communicating the identification information of user attached monitor device

110 to a non-associated device 172 may be enabled and other location technologies disabled.

In some cases, a maximum cost of resolving location may be set for user attached monitor device 110. For example, resolving WiFi location data or via a non-associated device may incur a per transaction cost to have a third-party service provider resolve the location information. When a maximum number of resolution requests have been issued, the WiFi position determination technology or the non-associated device approach may be disabled.

Further, it may be determined whether the likelihood that a particular position determination technology will be capable of providing meaningful location information. For example, where user attached monitor device 110 is moved indoors, GPS receiver 162 may be disabled to save power. Alternatively, where the tracking device is traveling at relatively high speeds, WiFi receiver 188 may be disabled. As yet another example, where cellular phone jamming is occurring, support for cell tower triangulation position determination may be disabled. As yet another example, where GPS jamming is occurring, GPS receiver 162 may be disabled. As yet another example, where user attached monitor device 110 is stationary, the lowest cost (from both a monetary and power standpoint) tracking may be enabled while all other technologies are disabled. Which position determination technologies are used may be based upon a zone in which a tracking device is located. Some zones may be rich in WiFi access points and in such zones WiFi technology may be used. Otherwise, another technology such as cell tower triangulation or GPS may be used. Based upon the disclosure provided herein, one of ordinary skill in the art will recognize other scenarios and corresponding combinations of technologies may be best.

Controller circuit 167 of user attached monitor device 110 at times functions in conjunction with wide area transceiver 168 to send and receive data and signals through wide area communication network 150. This link at times is useful for passing information and/or control signals between a central monitoring system 160 and user attached monitor device 110. The information transmitted may include, but is not limited to, location information, measured alcohol information, one or more passive or active impairment tests applied to the monitored individual, and information about the status of user attached monitor device 110. Based on the disclosure provided herein, one of ordinary skill in the art will recognize a variety of information that may be transferred via wide area communication network 150.

Various embodiments of user attached monitor device 110 include a variety of sensors capable of determining the status of user attached monitor device 110, and of the individual to which it is attached. For example, a status monitor 166 may include one or more of the following subcomponents: power status sensor 196 capable of indicating a power status of user attached monitor device 110, and/or a pulse/ECG sensor 1001 operable to sense pulse rate of the monitored individual and an electrocardiogram unique to the monitored individual based upon electrodes (not shown) in contact with the skin of the monitored individual. The power status may be expressed, for example as a percentage of battery life remaining. Based upon the disclosure provided herein, one of ordinary skill in the art will recognize a variety of forms in which power status may be expressed. The pulse rate may be expressed in beats per minute and the ECG may be shown visually via display 159. Based upon the disclosure provided herein, one of ordinary skill in the art will recognize a variety of forms in which pulse rate and/or ECG rate may be expressed.

In addition, user attached monitor device 110 includes a set of shielding sensors 169 that are capable of determining whether user attached monitor device 110 is being shielded from receiving GPS signals and/or if GPS jamming is ongoing, a set of device health indicators 154, a tamper sensor 151 capable of determining whether unauthorized access to user attached monitor device 110 has occurred or whether user attached monitor device 110 has been removed from an associated individual being monitored, and/or a motion/proximity sensor 152 capable of determining whether user attached monitor device 110 is moving and/or whether it is within proximity of an individual associated with user detached monitor device (not shown—see FIG. 3) associated with the monitored individual. In some cases, motion/proximity sensor 152 includes one or more accelerometer sensors and/or vibration gyro sensors that are capable of accurately sensing motion of the monitored individual. In addition, motion/proximity sensor 152 includes sensors capable of determining a proximity of user attached monitor device 110 to a monitored individual to which the device is assigned. This information may be used to assure that the monitored individual is wearing user attached monitor device 110. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into user attached monitor device 110 according to various different instances and/or embodiments.

In some embodiments, a user input (not shown) may be integrated into a display 159 and allows for a user of user attached monitor device 110 to provide information to user attached monitor device 110. Display 159 is communicatively coupled to controller circuit 167.

Figure 1C:
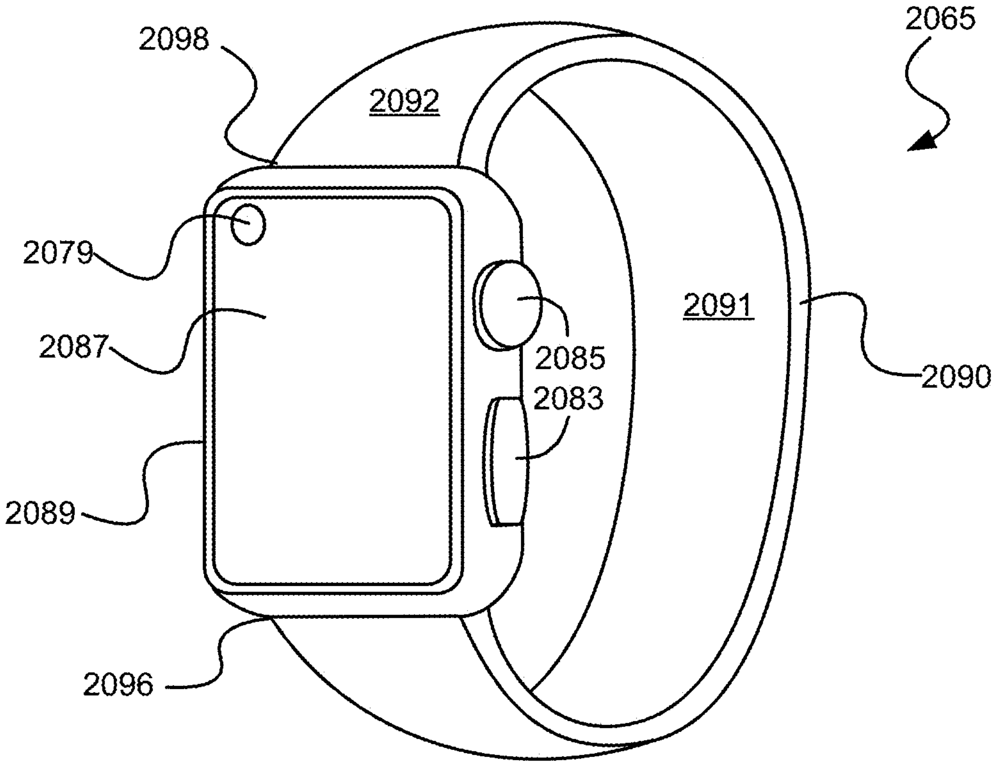

Turning to FIG. 1*c*, a user attached monitor device 2065 is shown with an example attachment element 2090 connected at opposite ends of user attached monitor device 2065 (i.e., a first end 2096 and a second end 2098). User attached monitor device 2065 is one example implementation of user attached monitor device 110 of FIGS. 1*a*-1*b* or user attached monitor device 310 of FIG. 3. Attachment element 2090 has an outer surface 2092 and an inner surface 2091. Attachment element 2090 is operable to securely attach a user attached monitor device 2065 to a limb of an individual in accordance with some embodiments. In some cases, attachment element 2090 is tailored to attach to a wrist of a monitored individual. In various embodiments, attachment element 2090 includes electrically and/or optically conductive material used to make a conductive connection from first end 2096 to second end 2098 through attachment element 2090 and is used in relation to determining whether user attached monitor device 2065 remains attached and/or has been tampered with. Thus, for example, where attachment element 2090 is cut, the conductive connection is broken indicating a tamper has occurred. While FIG. 1*c* shows a strap as an example attachment element, based upon the disclosure provided herein, one of ordinary skill in the art will recognize other types of attachment elements that may be used in relation to different embodiments. In other embodiments, attachment element 2090 is long enough to attach around the torso of the monitored individual and is sufficiently flexible to allow expansion and contraction of the chest of the monitored individual as they breath. Such expansion and contraction may be used to sense respiration rate of the monitored individual.

User attached monitor device 2065 includes a case 2089 in which various electronic components are maintained. In addition, user attached monitor device 2065 includes a button 2083, a radial dial 2085, a display 2087 (which may be a touchscreen display), and a combination speaker, microphone, and image sensor 2079. Together, user attached monitor device 2065 includes a button 2083, a radial dial 2085, a display 2087, a combination speaker, microphone, and image sensor 2079 provide the user interface for user attached monitor device 2065 and support the functionality of the various sensors discussed above in relation to FIG. 1*b*. Based upon the disclosure provided herein, one of ordinary skill in the art will recognize a variety of inputs and outputs that may be incorporated into user attached monitor device 2065 to provide the functionality discussed herein.

Figure 1D:

Turning to FIG. 1*d*, a user attached monitor device 1100 is shown with an example attachment element 1090 connected at opposite ends of a case 1089. User attached monitor device 1100 is another example implementation of user attached monitor device 110 of FIGS. 1*a*-1*b* or user attached monitor device 310 of FIG. 3. Attachment element 1090 is configured to securely attach a case 1089 to a limb of an individual in accordance with some embodiments. In various embodiments, attachment element 1090 includes electrically and/or optically conductive material used to make a conductive connection from one side of case 1089 to the opposite side of case 1089 and is used in relation to determining whether user attached monitor device 1100 remains attached and/or has been tampered with. While FIG. 1*d* shows a strap as an example attachment element, based upon the disclosure provided herein, one of ordinary skill in the art will recognize other types of attachment elements that may be used in relation to different embodiments.

Figure 2A:
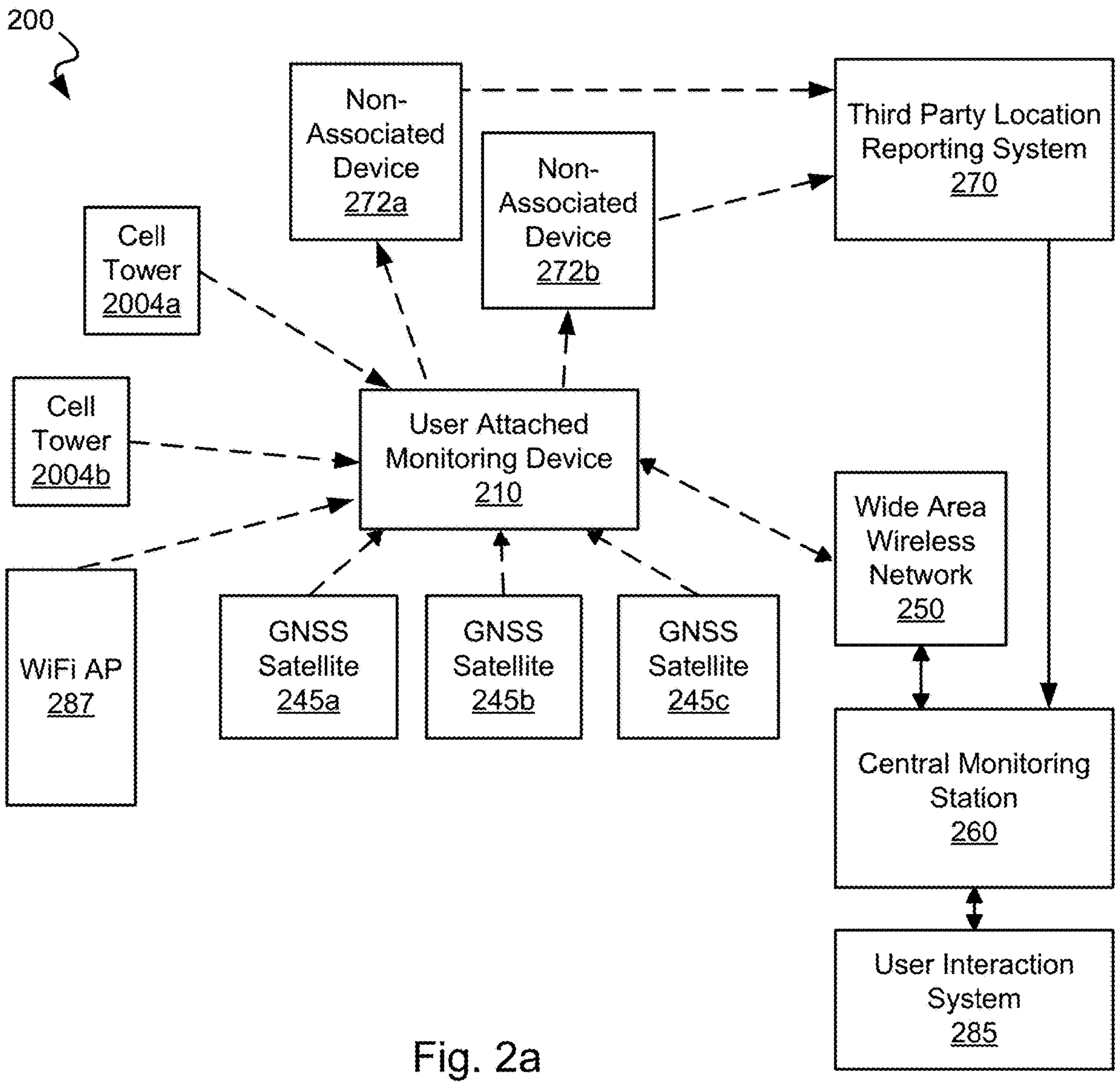
FIGS. 2*a*-2*c* are block diagrams illustrating another location monitoring system that includes a user detached monitoring device configured for selection of one of a number of location determination services supported by the user detached monitor device in accordance with some embodiments.

Turning to FIG. 2*a*, a block diagram illustrates a monitoring system 200 including a user detached monitor device 210 and a central monitoring station 260. Central monitoring station 260 is wirelessly coupled to user detached monitor device 210 via one or more wide area wireless (e.g., cellular telephone network, Internet via a WiFi access point, or the like) communication networks 250.

Central monitoring station 260 may be any location, device or system where location data and/or other types of data are received, including by way of non-limiting example: a cellular/smart phone, an email account, a website, a network database, and a memory device. The location data and/or other types of data are stored by central monitoring station 260 and are retrievable by a monitoring individual, such as a parent, guardian, parole officer, court liaison, spouse, friend, or other authorized group or individual. In this manner, the monitoring individual is able to respond appropriately to detected activity of a monitored individual. In some cases, the monitoring individual is able to retrieve the location data and/or other data types via a user interaction system 285 which may be, but is not limited to, a network connected user interface device communicatively coupled via a network to central monitoring station 260 and/or directly to user detached monitor device 210 via wide area wireless network 250.

Central monitoring station 260 may include a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the monitored individual in accordance with the described embodiments. In particular, the interactive web portals may enable the monitor to retrieve the location and user identification data of one or more monitored individuals, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website or mobile application accessible via a software application on a mobile device (e.g. smart phone). The mobile website may be a modified version of the server supported website with limited or additional capabilities suited for mobile location monitoring.

User detached monitor device 210 includes a location sensor or system that is capable of determining a location of user detached monitor device 210 and generates corresponding location data. For example, the location sensor or system that is capable of determining a location of user detached monitor device 210 may support a satellite based location determination service of user detached monitor device 210 that is capable of receiving wireless global navigation satellite system (hereinafter "GNSS") location information from a sufficient number of GPS or GNSS satellites 245 (i.e., one or more of GNSS satellites 245*a*, 245*b*, 245*c*) respectively. Where such a location sensor or system is available in user detached monitor device 210, user detached monitor device 210 may use the received wireless GNSS location information to calculate or otherwise determine the location of a human subject to which user detached monitor device 210 is attached. Global positioning system (hereinafter "GPS) is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone-based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user detached monitor device 210 receives location information from three or more GPS or GNSS satellites 245 via respective communication links. The location data and/or other data gathered by user detached monitor device 210 is wirelessly transmitted to central monitoring station 260 via wide area wireless network 250.

Further, the location sensor or system that is capable of determining a location of user detached monitor device 210 may include WiFi based location determination circuitry that is configured to communicate with one or more WiFi access points 287, and based thereon to determine location of user detached monitor device 210. Such use of WiFi to establish location by user detached monitor device 210 is referred to as a WiFi based location determination service of user detached monitor device 210.

Yet further, the location sensor or system that is capable of determining a location of user detached monitor device 210 may include non-associated device-based location determination circuitry that is configured to sense that one or more non-associated devices 272 (e.g., a non-associated device 272*a* and/or a non-associated device 272*b*) is/are within range of user detached monitor device 210, and to communicate (i.e., transmit) an identification of user detached monitor device 210 to the identified non-associated device. In some embodiments, the aforementioned communications are performed via BlueTooth™ or another relatively short-range, low-power communication protocol. Based upon the disclosure provided herein, one of ordinary skill in the art will recognize a variety of protocols that may be used for communications between user detached monitor device 210 and a nearby non-associated device 272. Such use of non-associated devices to establish location by user detached monitor device 210 is referred to as a non-associated device based location determination service of user detached monitor device 210.

In turn, the non-associated device that received the identification information from user detached monitor device 210 reports the identification received from user detached monitor device 210 and the location of the non-associated device to a third-party location reporting system 270. Third-party location reporting system 270 in turn transfers the received identification and location information to a recipient registered with the received identification in third-party location reporting system 270. In this case, the recipient registered with the received identification in third-party location reporting system 270 is central monitoring station 260. In such a case, a location of the non-associated device that provided the identification of user detached monitor device 210 to third-party location reporting system 270 is established by central monitoring station 260 as the location of user detached monitor device 210.

Additionally, the location sensor or system that is capable of determining a location of user detached monitor device 210 may include cell-tower based location determination circuitry that is configured to communicate with one or more cell towers 2004 (e.g., a cell tower 2004*a* and/or a cell tower 2004*b*), and based thereon to determine location of user detached monitor device 210. Such use of cell tower(s) to establish location by user detached monitor device 210 is referred to as a cell tower based location determination service of user detached monitor device 210.

Power requirements, costs, accuracy, and availability for each of the satellite based location determination service, the WiFi based location determination service, the non-associated device based location determination service, and the cell tower based location determination service may be different. In some embodiments, user detached monitor device 210 and/or central monitoring station 260 may be configured to select one of the available location determination services based upon a combination of cost requirements, power requirements, accuracy requirements, and/or availability. An example embodiment of selecting one of the available location determination services of user detached monitor device 210 is discussed below in relation to FIGS. 4-5.

Figure 2B:
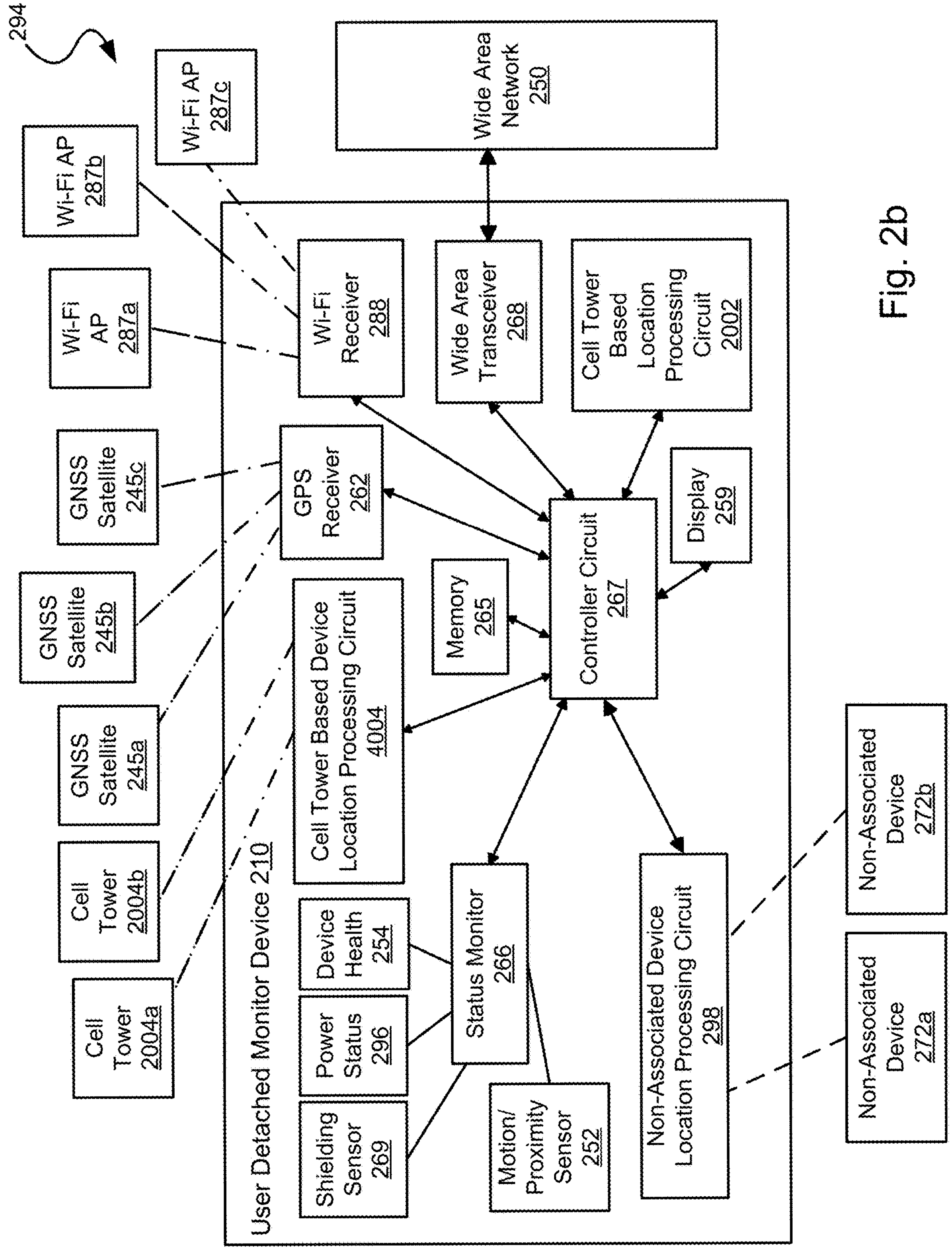

Turning to FIG. 2*b*, a block diagram 294 of user detached monitor device 210 is shown in accordance with some embodiments. As shown, user detached monitor device 210 includes a device ID 261 that may be maintained in a memory 265, and is thus accessible by a controller circuit 267. Controller circuit 267 may interact with a GPS receiver 262 (an example of a satellite based location service of user detached monitor device 210) and memory 265 at times for storing and generating records of successively determined GPS locations. Similarly, controller circuit 267 may interact with a WiFi receiver 288 (an example of a WiFi based location service of user detached monitor device 210) and memory 265 at times for storing and generating records of successively determined WiFi access point identifications and signal strength; controller circuit 267 may interact with cell tower based location processing circuit 2004 (an example of a cell tower based location service of user detached monitor device 210) and memory 265 at times for storing and generating records of successive locations determined based upon communications with cell towers 2004; and controller circuit 267 interacts with a non-associated device location processing circuit 298 (an example of a non-associated device based location service of user detached monitor device 210) for causing location information to be transmitted to central monitoring station 260 via third party location reporting system 270.

In some cases, memory 265 may include instructions (e.g., software-based or firmware-based instructions) executable by controller circuit 267 to enable and disable one or more of a satellite based location service of user detached monitor device 210, a WiFi based location service of user detached monitor device 210, a cell tower based location service of user detached monitor device 210, and/or a non-associated device based location service of user detached monitor device 210; and to select one of the satellite based location service of user detached monitor device 210, a WiFi based location service of user detached monitor device 210, a cell tower based location service of user detached monitor device 210, and/or a non-associated device based location service of user detached monitor device 210 to perform location determination. An example embodiment of selecting one of the available location determination services of user detached monitor device 210 is discussed below in relation to FIGS. 4-5.

Non-associated device location processing circuit 298 is configured to sense that one or more non-associated devices 272 is/are within range of user detached monitor device 210, and to communicate (i.e., transmit) an identification of user detached monitor device 210 to the identified non-associated device. In turn, the non-associated device that received the identification information from user detached monitor device 210 reports the identification received from user detached monitor device 210 and the location of the non-associated device to third-party location reporting system 270. Third-party location reporting system 270 in turn transfers the received identification and location information to a recipient registered with the received identification in the system. In this case, the recipient registered with the received identification in the system is central monitoring station 260. The power requirements of the user detached monitor device 210 for identifying the non-associated device and communicating the identification to the non-associated device may be substantially less than, for example, determining location based either on WiFi access points 287 or GNSS satellites 245.

The selection between the satellite based location service of user detached monitor device 210, a WiFi based location service of user detached monitor device 210, a cell tower based location service of user detached monitor device 210, and/or a non-associated device based location service of user detached monitor device 210 as the service to be used for determining a location of user detached monitor device 210 may use controls or default values programmable via central monitor station 260, and/or based upon conditions detected in user detached monitor device 210 with corresponding pre-determined controls or default values. For example, it may be determined whether sufficient battery power as reported by power status 296 remains in user detached monitor device 210 to support a particular position determination technology. Where insufficient power remains, using the proxy location by communicating the identification information of user detached monitor device 210 to a non-associated device 272 may be enabled and other location technologies disabled.

In some cases, a maximum cost of resolving location may be set for user detached monitor device 210. For example, resolving WiFi location data or via a non-associated device may incur a per transaction cost to have a third-party service provider resolve the location information. When a maximum number of resolution requests have been issued, the WiFi position determination technology or the non-associated device approach may be disabled.

Further, it may be determined whether the likelihood that a particular position determination technology will be capable of providing meaningful location information. For example, where user detached monitor device 210 is moved indoors, GPS receiver 262 may be disabled to save power. Alternatively, where the tracking device is traveling at relatively high speeds, WiFi receiver 288 may be disabled. As yet another example, where cellular phone jamming is occurring, support for cell tower triangulation position determination may be disabled. As yet another example, where GPS jamming is occurring, GPS receiver 262 may be disabled. As yet another example, where user detached monitor device 210 is stationary, the lowest cost (from both a monetary and power standpoint) tracking may be enabled while all other technologies are disabled. Which position determination technologies are used may be based upon a zone in which a tracking device is located. Some zones may be rich in WiFi access points and in such zones WiFi technology may be used. Otherwise, another technology such as cell tower triangulation or GPS may be used. Based upon the disclosure provided herein, one of ordinary skill in the art will recognize other scenarios and corresponding combinations of technologies may be best.

Controller circuit 267 of user detached monitor device 210 at times functions in conjunction with wide area transceiver 268 to send and receive data and signals through wide area communication network 250. This link at times is useful for passing information and/or control signals between a central monitoring system 260 and user detached monitor device 210. The information transmitted may include, but is not limited to, location information, measured alcohol information, one or more passive or active impairment tests applied to the monitored individual, and information about the status of user detached monitor device 210. Based on the disclosure provided herein, one of ordinary skill in the art will recognize a variety of information that may be transferred via wide area communication network 250.

Various embodiments of user detached monitor device 210 include a variety of sensors capable of determining the status of user detached monitor device 210, and of the individual to which it is attached. For example, a status monitor 266 may include a power status sensor 296 capable of indicating a power status of user detached monitor device 210. The power status may be expressed, for example as a percentage of battery life remaining. Based upon the disclosure provided herein, one of ordinary skill in the art will recognize a variety of forms in which power status may be expressed.

In addition, user detached monitor device 210 includes a set of shielding sensors 269 that are capable of determining whether user detached monitor device 210 is being shielded from receiving GPS signals and/or if GPS jamming is ongoing, a set of device health indicators 254, and/or a motion/proximity sensor 252 capable of determining whether user detached monitor device 210 is moving and/or whether it is within proximity of an individual associated with user attached monitor device (not shown—see FIG. 3) associated with the monitored individual. In some cases, motion/proximity sensor 252 includes one or more accelerometer sensors and/or vibration gyro sensors that are capable of accurately sensing motion of the monitored individual. In addition, motion/proximity sensor 252 includes sensors capable of determining a proximity of user detached monitor device 210 to a monitored individual to which the device is assigned. This information may be used to assure that the monitored individual is wearing user detached monitor device 210. Based on the disclosure provided herein, one of ordinary skill in the art will recognize a variety of shielding sensors, a variety of device health transducers and indicators, various different types of motion sensors, different proximity to human sensors, and various human body physical measurement sensors or transducers that may be incorporated into user detached monitor device 210 according to various different instances and/or embodiments.

In some embodiments, a user input (not shown) may be integrated into a display 259 and allows for a user of user detached monitor device 210 to provide information to user detached monitor device 210. Display 259 is communicatively coupled to controller circuit 267.

Figure 2C:
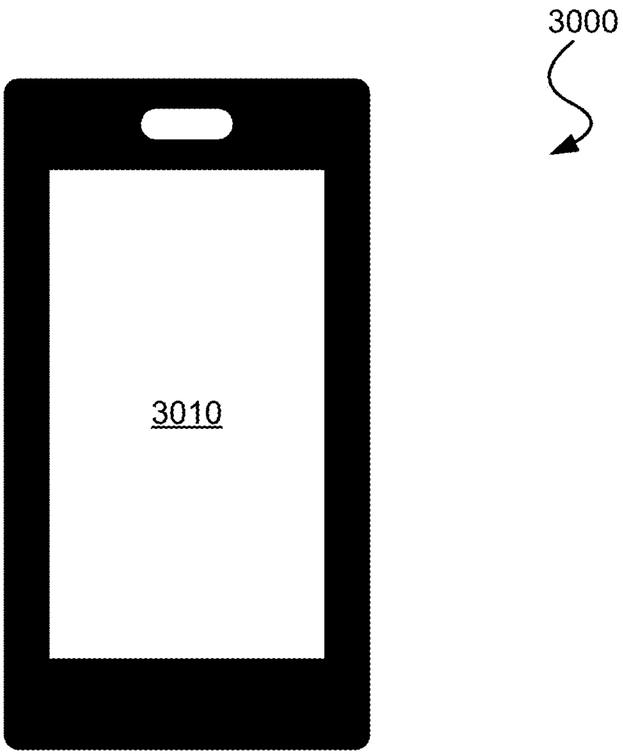

Turning to FIG. 2*c*, an example user detached monitor device 3000 is shown. User detached monitor device 3000 is one example implementation of user detached monitor device 210 of FIGS. 2*a*-2*b* or user detached monitor device 320 of FIG. 3. User detached monitor device 3000 may be a cellular telephone or other cellular based communication device with a touch screen display 3010. Based upon the disclosure provided herein, one of ordinary skill in the art will recognize a variety of device types that may be used as user detached monitor devices in accordance with different embodiments including, but not limited to, tablet devices.

Figure 3:
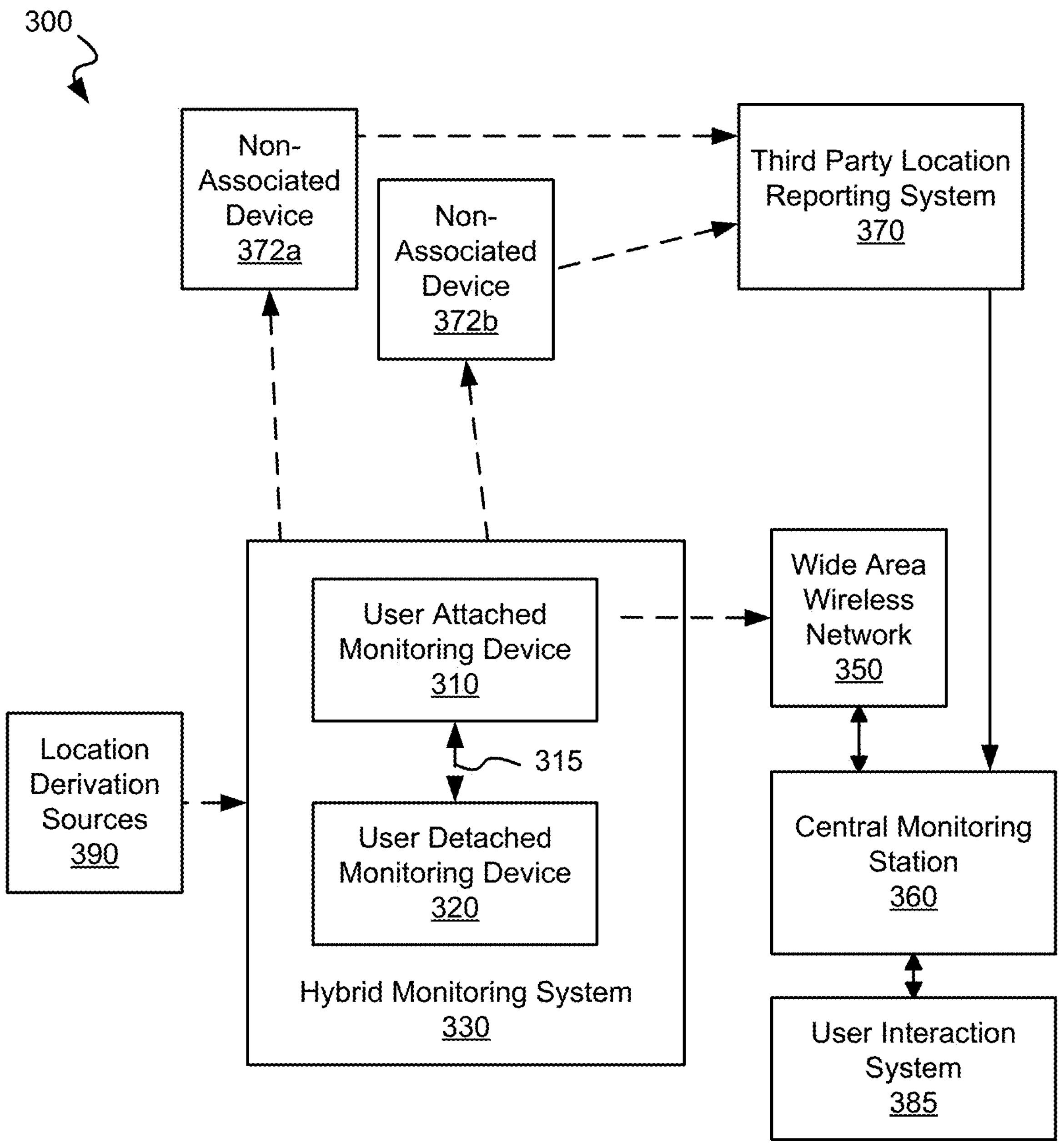
FIG. 3 is a block diagram of a location monitoring system including a hybrid monitoring system configured to select one of a number of location determination services supported across both a user attached monitor device and a user detached monitor device in accordance with some embodiments.

Turning to FIG. 3, a block diagram is shown of a location monitoring system 300 including a hybrid monitoring system 330 includes both a user attached monitor device 310 and a user detached monitor device 320. In some embodiments, user attached monitor device 310 may be similar to user attached monitor device 110; and user detached monitor device 320 may be similar to user detached monitor device 210. As such, a location of a monitored individual associated with hybrid monitoring system 330 may be established using any location determination service supported by either user attached monitor device 310 or user detached monitor device 320. This may include, for example, establishing location using any of: a satellite based location service of user attached monitor device 310, a WiFi based location service of user attached monitor device 310, a cell tower based location service of user attached monitor device 310, a beacon based location service of user attached monitor device 310, a non-associated device based location service of user attached monitor device 310, a satellite based location service of user detached monitor device 320, a WiFi based location service of user detached monitor device 320, a cell tower based location service of user detached monitor device 320, and/or a non-associated device based location service of user detached monitor device 320.

Power requirements, costs, accuracy, and availability for each of a satellite based location service of user attached monitor device 310, the WiFi based location service of user attached monitor device 310, the cell tower based location service of user attached monitor device 310, the beacon based location service of user attached monitor device 310, the non-associated device based location service of user attached monitor device 310, the satellite based location service of user detached monitor device 320, the WiFi based location service of user detached monitor device 320, the cell tower based location service of user detached monitor device 320, and/or the non-associated device based location service of user detached monitor device 320 may be different. In some embodiments, any of or a combination of user attached monitor device 310, user detached monitor device, and/or central monitoring station 360 may be configured to select one of the available location determination services based upon a combination of cost requirements, power requirements, accuracy requirements, and/or availability. An example embodiment of selecting one of the available location determination services of hybrid monitoring system 330 is discussed below in relation to FIGS. 4-5.

User detached monitor device 320 is portable, and may be any device that is recognized as being used by or assigned to an individual being monitored, but is not physically attached to the individual being monitored by a tamper evident attaching device. User detached monitor device 320 may be, but is not limited to, a cellular or mobile telephone configured to communicate with user attached monitor device 310 via a local communication link 315. In contrast, user attached monitor device 310 is attached to the individual being monitored using a tamper evident attaching device like a strap. User attached monitor device 310 may be, but is not limited to, a tracking device that is attached around the limb of an individual and includes indicators to monitor whether the device has been removed from the individual or otherwise tampered.

Location monitoring system 300 further includes a central monitoring station 360 wirelessly coupled to user attached monitor device 310 and/or user detached monitor device 320 via one or more wide area wireless (e.g., cellular telephone network, Internet via a Wi-Fi access point, or the like) communication networks 350.

User detached monitor device 320 may further include a user identification sensor operable to generate user identification data for identifying the user in association with the generation of the location data. The user identification data may comprise one or more of: image data, video data, biometric data (e.g. fingerprint, DNA, retinal scan, etc. data), or any other type of data that may be used to verify the identity of the user at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 360 via a wireless transmitter communicatively coupled to the user identification sensor. The user identification data is stored in association with the location data by central monitoring station 360 and is retrievable therefrom by a monitor, such as a parent, guardian, parole officer, court liaison, spouse, friend, or other authorized group or individual. The monitor is configured to retrieve the location data via a network connected user interface device communicatively coupled—via the network—to central monitoring station 360 and/or to user detached monitor device 320. The location data may be transmitted to central monitoring station 360 independent of the user identification data, for example, during a periodic check-in with central monitoring system 360.

Figure 4:
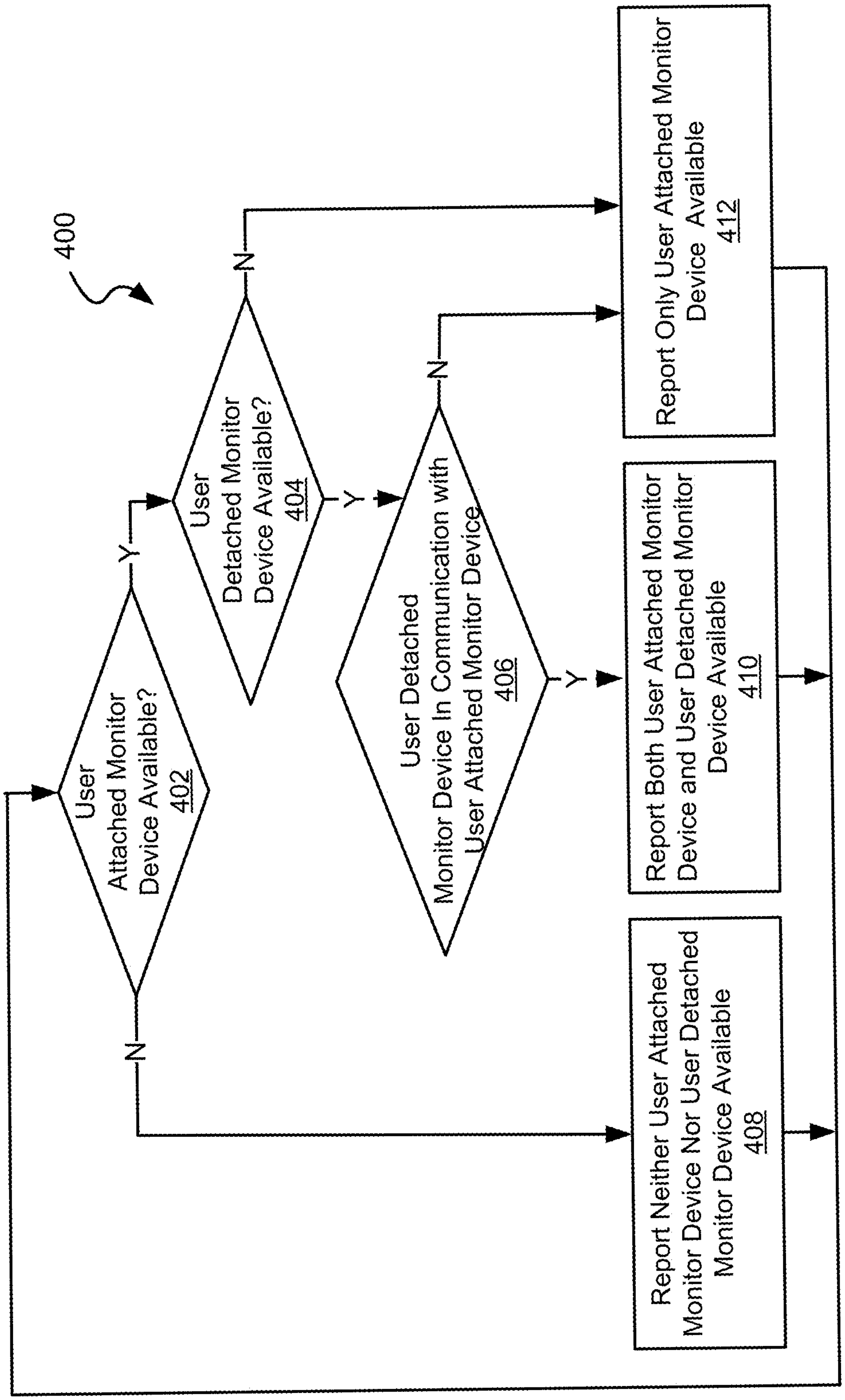
FIG. 4 is a flow diagram showing a method in accordance with some embodiments for reducing a list of available location determination services based upon availability of a user attached monitor device and/or a user detached monitor device.

Turning to FIG. 4, a flow diagram 400 shows a method in accordance with some embodiments for reducing a list of available location determination services based upon device power status. Following flow diagram 400, it is determined whether a user attached monitor device associated with a monitored individual is available (block 402). This may include, for example, determining that communication with a user attached monitor device associated with the monitored individual is possible indicating that the user attached monitor device is operational. The communication may be from, for example, a user detached monitor device and/or a central monitoring station. Based upon the disclosure provided herein, one of ordinary skill in the art will recognize a variety of approaches that may be used in relation to different embodiments to determine that a user attached monitor device is available.

Where a user attached monitor device is available (block 402), it is determined whether a user detached monitor device is available (block 404). This may include, for example, determining that communication with a user detached monitor device associated with the monitored individual is possible indicating that the user detached monitor device is operational. The communication may be from, for example, a user attached monitor device and/or a central monitoring station. Based upon the disclosure provided herein, one of ordinary skill in the art will recognize a variety of approaches that may be used in relation to different embodiments to determine that a user detached monitor device is available.

Where it is determined that the user detached monitor device is available (block 402), it is determined whether the user detached monitor device is within a communication range of the user attached monitor device (block 406). In some embodiments, communication between the user detached monitor device and the user attached monitor device may be via a short range communication protocol such as, for example, BlueTooth™ with a limited communication range. Where such communication is possible, the user detached monitor device is within the defined range of the user attached monitor device, and thus any location determination done by a location determination service on the user detached monitor device may be assumed to be reasonably close to the monitored individual associated with both the user attached monitor device and the user detached monitor device.

Where it is determined that the user detached monitor device is within a communication range of the user attached monitor device (block 406), a hybrid monitoring system is available and both the user attached monitor device and the user detached monitor device are reported as available (block 410). In such a situation, any location determination service supported by either of the user attached monitor device or the user detached monitor device of the hybrid monitoring system may be used to establish location. Thus, using hybrid monitoring system 300 as an example, any of: a satellite based location service of user attached monitor device 310, the WiFi based location service of user attached monitor device 310, the cell tower based location service of user attached monitor device 310, the beacon based location service of user attached monitor device 310, the non-associated device based location service of user attached monitor device 310, the satellite based location service of user detached monitor device 320, the WiFi based location service of user detached monitor device 320, the cell tower based location service of user detached monitor device 320, and/or the non-associated device based location service of user detached monitor device 320 may be selected.

Alternatively, where it is found that either user detached monitor device is not within communication range of the user attached monitor device (block 406) or user detached monitor device is not available (block 404), only user attached monitor device is reported as available (block 412). In such a case, only location determination services supported by the user attached monitor device may be used to establish location. Thus, using monitoring system 100 as an example, any of: the satellite based location service of user attached monitor device 110, the WiFi based location service of user attached monitor device 110, the cell tower based location service of user attached monitor device 110, the beacon based location service of user attached monitor device 110, and/or the non-associated device based location service of user attached monitor device 110 may be selected.

Alternatively, where the user attached monitor device is not available (block 402), neither of the user attached monitor device nor the user detached monitor device are reported as available (block 408). In such a case, no location determination services are available. In other embodiments, it is possible to operate with only user detached monitor device and therefore find any of the location determination services of the user detached monitor device usable for determining location. In such a situation the location information would only be useful for determining the location of a monitored individual if the monitored individual is required to periodically check-in using the user detached monitor device to ensure that the monitored individual is near the user detached monitor device. The processes discussed in relation to FIG. 4 are repeatedly performed as there may be a change in availability of one of the user attached monitor device and/or the user detached monitor device. Where the availability changes, it is updated and may impact other processes including, but not limited to, those processes discussed below in relation to FIG. 5*a*.

Figure 5A:
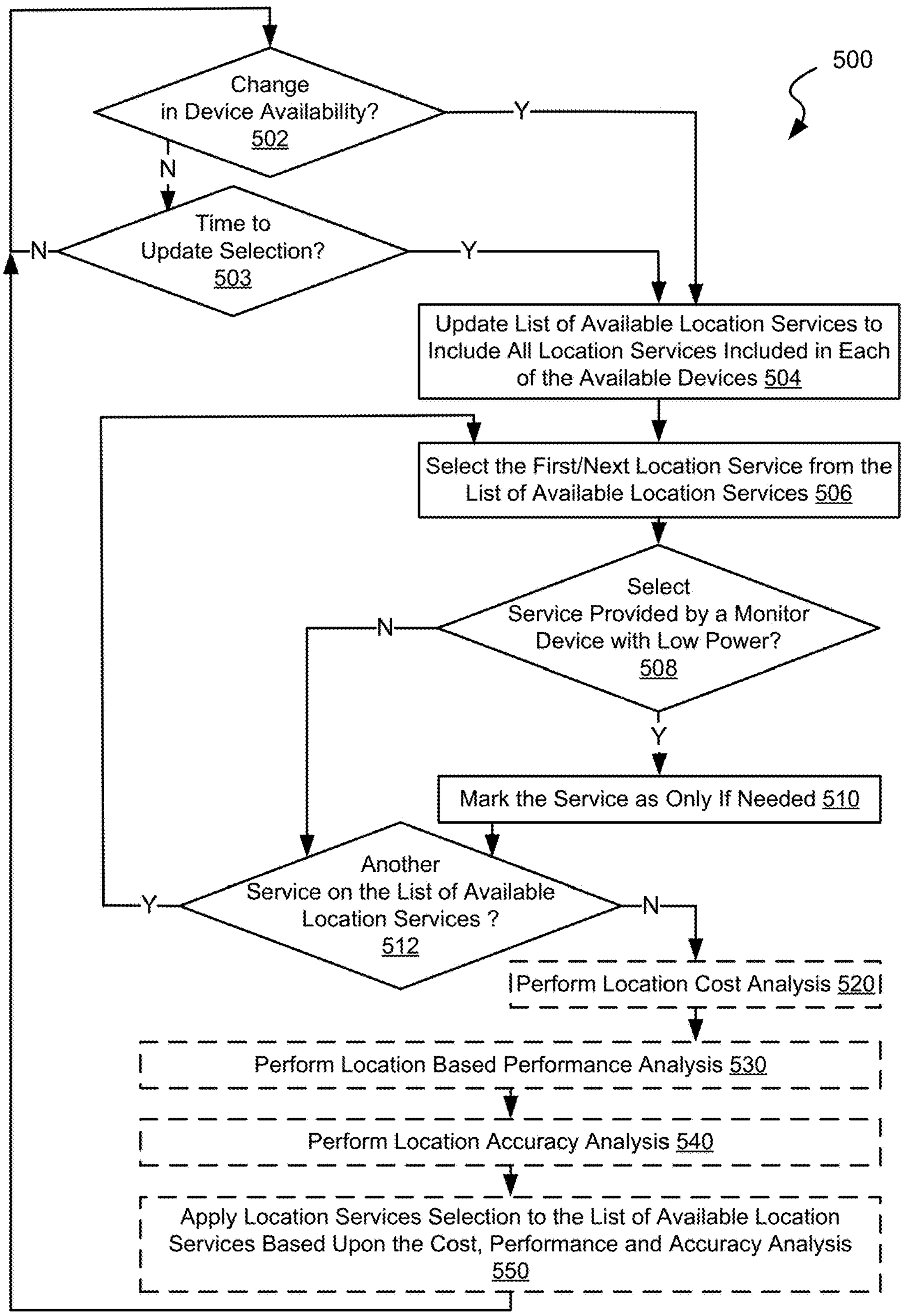
FIGS. 5*a*-5*e* are flow diagrams showing methods in accordance with various embodiments for selecting between a number of available location determination services and reducing power consumed by any unselected location determination services.

Turning to FIGS. 5*a*-5*e*, flow diagrams showing methods in accordance with various embodiments for selecting between a number of available location determination services and reducing power consumed by any unselected location determination services. Turning specifically to FIG. 5*a* and following a flow diagram 500, it is determined whether there has been a change in device availability (block 502). This may be determined, for example, based upon availability being updated using the processes discussed above in relation to FIG. 4. In some cases, such device availability is stored to a register in a memory which can be accessed to determine whether device availability has changed.

Where it is found that no change in device availability has occurred (block 502), it is determined whether it is time to update the selection of the location determination service used to determine the location of a monitored individual (block 503). As power status and location can impact the choice of which location determination service is to be used, the process of selection is repeated periodically. In some embodiments, such periodicity may be at a fixed point in time, such as, for example, every thirty (30) minutes. In such a case, a timer is used in any of the user attached monitor device, the user detached monitor device, and/or the central monitoring station to indicate the time to update the selection of the location determination service. In other embodiments, the periodicity may be variable based upon, for example, a rate at which the location of the monitored individual is changing and/or the rate at which power is being used by the monitor device supporting the currently selected location determination service. Based upon the disclosure provided herein, one of ordinary skill in the art will recognize a variety of approaches that may be used in relation to different embodiments to trigger an update of the selection of the location determination service.

Where either the availability has changed (block 502) or it is time to update the selection (block 503), a list of available location determination services is updated to include all location determination services supported in each of the available devices (block 504). Thus, as an example, where hybrid monitoring system 300 is used and both user attached monitor device 310 and user detached monitor device 320 are available, the list of available location determination services is updated to include: the satellite based location service of user attached monitor device 310, the WiFi based location service of user attached monitor device 310, the cell tower based location service of user attached monitor device 310, the beacon based location service of user attached monitor device 310, the non-associated device based location service of user attached monitor device 310, the satellite based location service of user detached monitor device 320, the WiFi based location service of user detached monitor device 320, the cell tower based location service of user detached monitor device 320, and/or the non-associated device based location service of user detached monitor device 320. Alternatively, where hybrid monitoring system 300 is used and only user attached monitor device 310 is available, the list of available location determination services is updated to include: the satellite based location service of user attached monitor device 310, the WiFi based location service of user attached monitor device 310, the cell tower based location service of user attached monitor device 310, the beacon based location service of user attached monitor device 310, the non-associated device based location service of user attached monitor device 310.

A first or next of the location determination services included in the list of available location determination services is selected (block 506). It is determined whether the monitor device supporting the selected location determination service is at a low power stage (block 508). A lower power state may be a user programmable state, such as, for example, less than twenty (20) percent of its total power capacity remaining. Based upon the disclosure provided herein, one of ordinary skill in the art will recognize a variety of power levels both fixed and variable that may be used to define a low power state in relation to different embodiments. Where the selected location determination service is supported by a device operating in a low power state (block 508), the selected location determination service is marked in the list of available location determination services as "Only If Needed) (block 510). As such, the selected location determination service will only be selected to provide location information for the monitored individual if a location determination service in a device operating above a low power state is available.

It is determined whether another location determination service in the list of available location determination services remains to be evaluated (block 512). Where another remains to be evaluated (block 512), the processes of blocks 506-512 are repeated for the next selected location determination service. Once all location determination services have been evaluated based upon power considerations (block 512), a location cost analysis is performed (block 520).

Figure 5B:
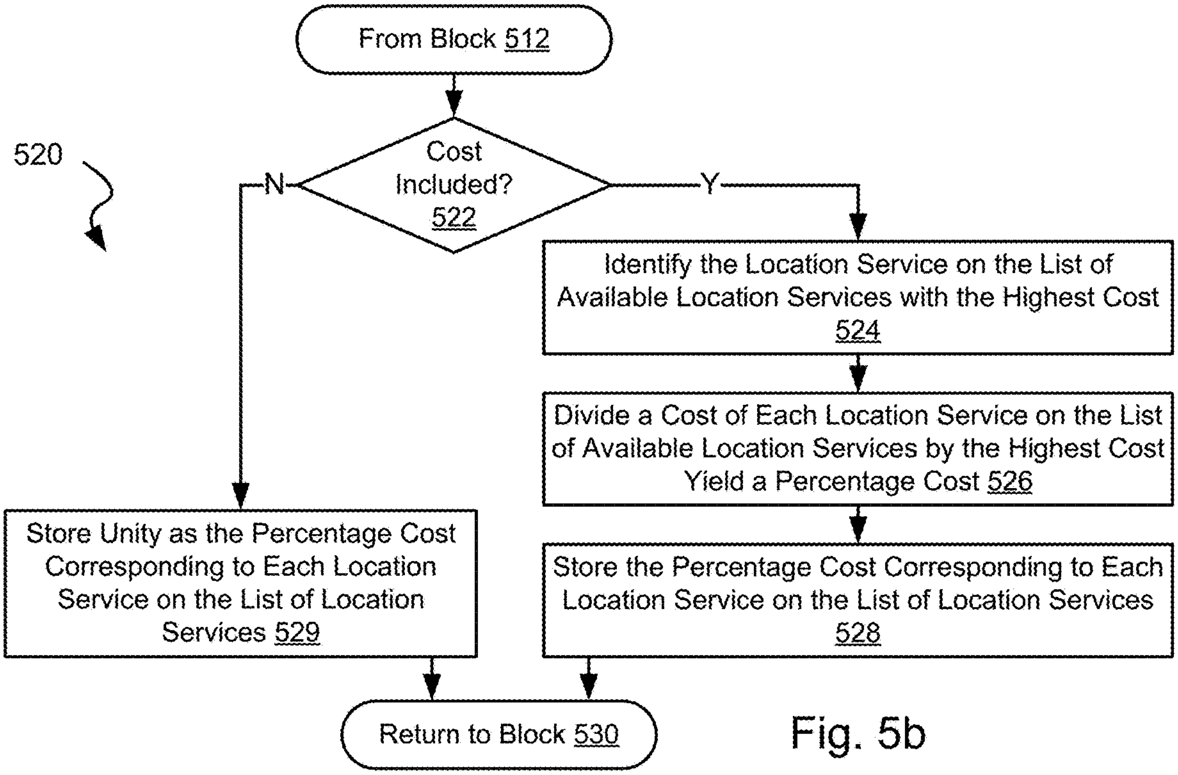

Block 520 is shown in dashed lines as it represents a flow diagram 520 (purposely of the same number) shown in FIG. 5*b*. Turning to FIG. 5*b* and following flow diagram 520, it is determined whether cost is to be used as a basis for selecting a location determination service (block 522). One or more of the location determination services may incur a third-party cost. For example, using a WiFi location service may require a per access cost to a map of locations of various WiFi access points and/or using a non-associated device based location service may require a per access cost. Based upon the disclosure provided herein, one of ordinary skill in the art will recognize a variety of costs that may be incurred in relation to different location determination services.

Where cost is to be considered in selecting a location determination service (block 522), the cost for using each of the location determination services on the list of available location determination services is determined and the highest cost is identified (block 524). The costs may be maintained in memory of one or more of the user attached monitor device, the user detached monitor device, and/or the central monitoring station. The cost of each of the location determination services included in the list of available location determination services is divided by the highest cost to yield a percentage cost for each of the location determination services (block 526). This percentage cost is stored in memory relative to each of the location determination services included in the list of available location determination services (block 528).

Alternatively, where cost is not a consideration in selecting a location determination service (block 522), the percentage cost for each of the location determination services included in the list of available location determination services is stored as unity (1) (block 529). The process then returns to block 530 of FIG. 5*a*.

Figure 5C:
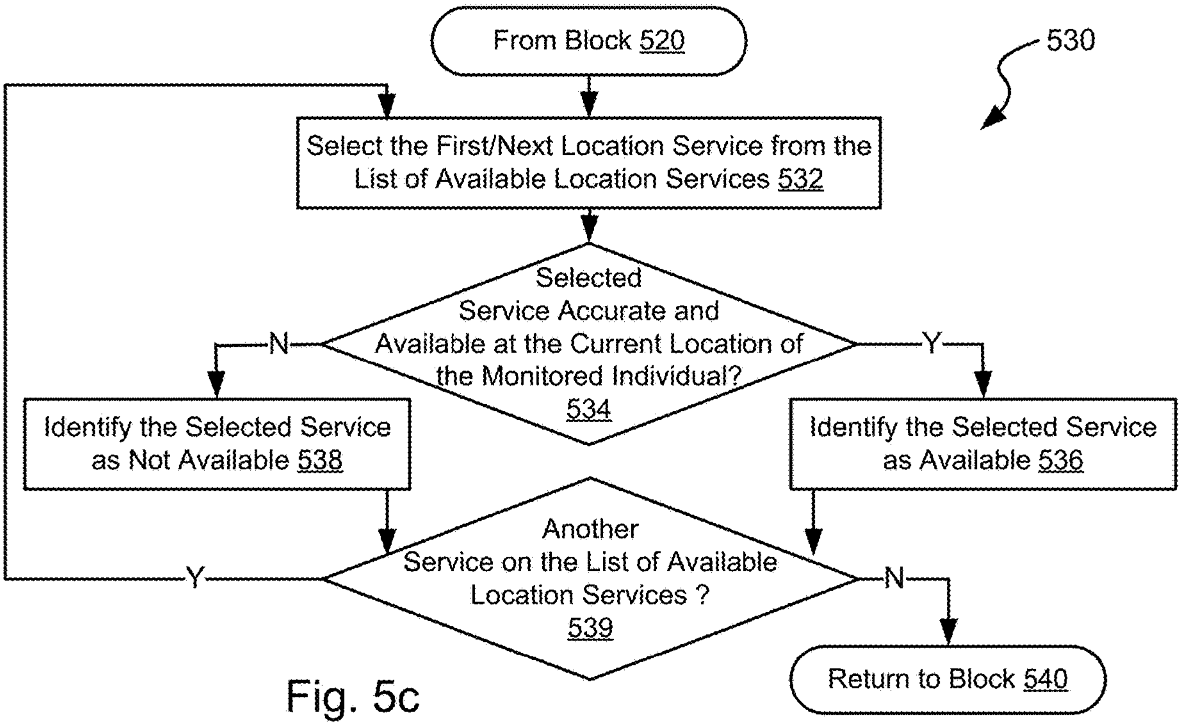

Returning to FIG. 5*a*, a location based performance analysis is performed (block 530). Block 530 is shown in dashed lines as it represents a flow diagram 530 (purposely of the same number) shown in FIG. 5*c*. Turning to FIG. 5*c* and following flow diagram 530, a first or next of the location determination services included in the list of available location determination services is selected (block 532). It is determined if the selected location determination service is accurate and available at the current location of the monitor device supporting the service (block 534). As an example, where the current location is inside and a satellite based location determination service does not operate inside, it is determined to be inaccurate and/or unavailable. As another example, where the monitor device is at a location where beacons are not available, it is determined to be inaccurate and/or unavailable. In some embodiments, this determination may be at least in part made based upon a map maintained of where different location determination services are available and/or accurate. In various embodiments, this determination may be based at least in part upon receiving location data from the selected location determination service to discern whether the data is useful. Based upon the disclosure provided herein, one of ordinary skill in the art will recognize a variety of approaches that may be used in relation to different embodiments to determine whether a particular location determination service is both available and accurate at a particular location.

Where the selected location determination service is determined to be either or both unavailable or inaccurate at the current location of the monitor device (block 534), the selected location determination service is identified in the list of available location determination services as unavailable (block 538). In some embodiments, this may include removing the selected location determination service from the list of available location determination services. Alternatively, where the selected location determination service is determined to be both available and accurate at the current location of the monitor device (block 534), the selected location determination service is identified in the list of available location determination services as available (block 536).

It is determined whether another location determination service in the list of available location determination services remains to be evaluated (block 539). Where another remains to be evaluated (block 539), the processes of blocks 532-539 are repeated for the next selected location determination service. Once all location determination services have been evaluated based upon availability and accuracy considerations (block 539), a location accuracy analysis is performed (block 540).

Figure 5D:
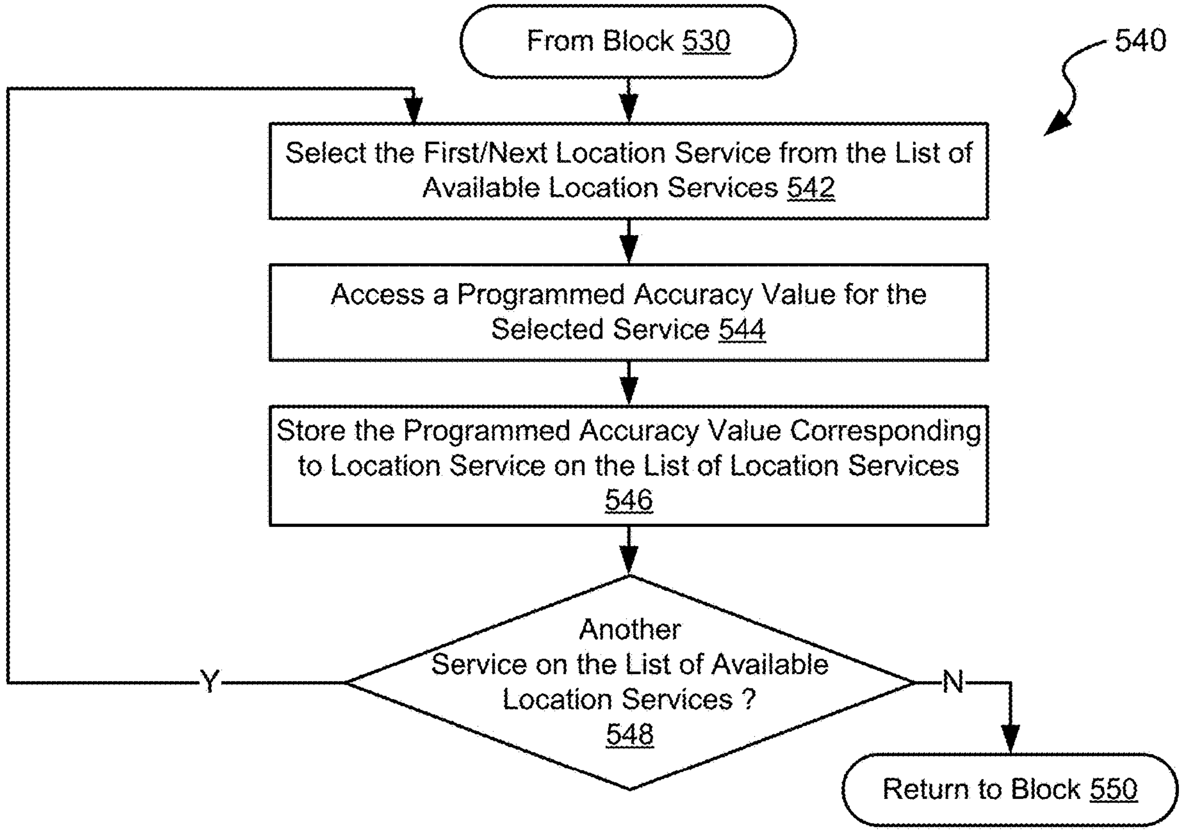

Returning to FIG. 5*a*, a location accuracy analysis is performed (block 540). Block 540 is shown in dashed lines as it represents a flow diagram 540 (purposely of the same number) shown in FIG. 5*d*. Turning to FIG. 5*d* and following flow diagram 540, a first or next of the location determination services included in the list of available location determination services is selected (block 542). Accuracy data for the selected location determination service is accessed as a programmed accuracy value (block 544). This accuracy information may be programmed into a memory and may be listed as, for example, an error for the particular location determination service. As one example, a satellite location determination service may provide accuracy with an error of six (6) feet and a WiFi based location service may provide accuracy with an error of forty (40) feet. The programmed accuracy value is stored in relation to the selected location determination service (block 546).

It is determined whether another location determination service in the list of available location determination services remains to be evaluated (block 548). Where another remains to be evaluated (block 548), the processes of blocks 542-548 are repeated for the next selected location determination service. Once all location determination services have been evaluated (block 548), a location determination service selection is applied to the list of available location determination services based upon the preceding cost, cost analysis is performed (block 550).

Figure 5E:
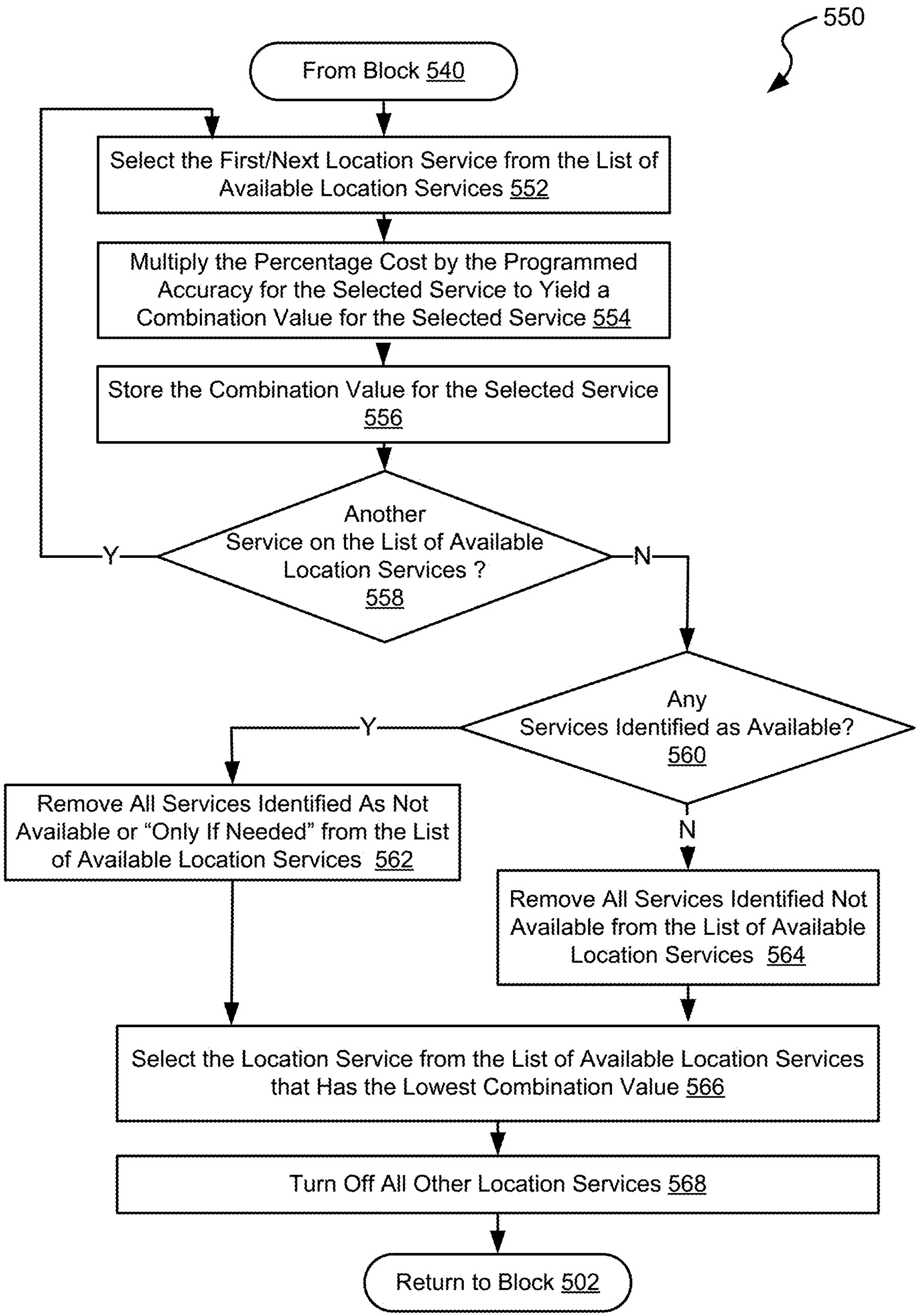

Returning to FIG. 5*a*, a location determination service selection is applied to the list of available location determination services based upon the preceding cost, cost analysis is performed (block 550). Block 550 is shown in dashed lines as it represents a flow diagram 550 (purposely of the same number) shown in FIG. 5*c*. Turning to FIG. 5*e* and following flow diagram 550, a first or next of the location determination services included in the list of available location determination services is selected (block 552). The percentage cost is multiplied by the programmed accuracy value associated with the selected location determination service to yield a combination value for the selected location determination service (block 554). In some embodiments one or both of the percentage cost and/or the programmed accuracy value are weighted to change the relative weight given to the respective parameters in the combination value. In some such embodiments, the weight(s) to be applied are user programmable. The combination value is stored in relation to the selected location determination service (block 556).

It is determined whether another location determination service in the list of available location determination services remains to be evaluated (block 558). Where another remains to be evaluated (block 558), the processes of blocks 552-558 are repeated for the next selected location determination service. Once all location determination services have been updated with the respective combination value (block 558), it is determined whether any location determination services in the list of available location determination services is available (block 560). Such availability is that identified in blocks 536-538 of FIG. 5*c*, except that a location determination service that was identified as "Only If Needed" is considered unavailable. Where at least one location determination service is identified as available (block 560), all location determination services in the list of available location determination services that are either identified as unavailable (block 538) or "Only If Needed" (block 510) are removed from the list of available location determination services (block 562). Alternatively, where either all of the location determination services in the list of available location determination services are identified as unavailable (block 538) or identified as "Only If Needed" (block 510), all location determination services in the list of available location determination services that are identified as unavailable (block 538) are removed from the list of available location determination services (block 564).

The location determination service in the list of available location determination services that has the lowest combination value is selected (block 566). This is the location determination service that will be used to update the location of the monitored individual. All other location determination services are turned off to save power (block 568). Processing is then returned to block 502 of FIG. 5*a*.

Figure 6:
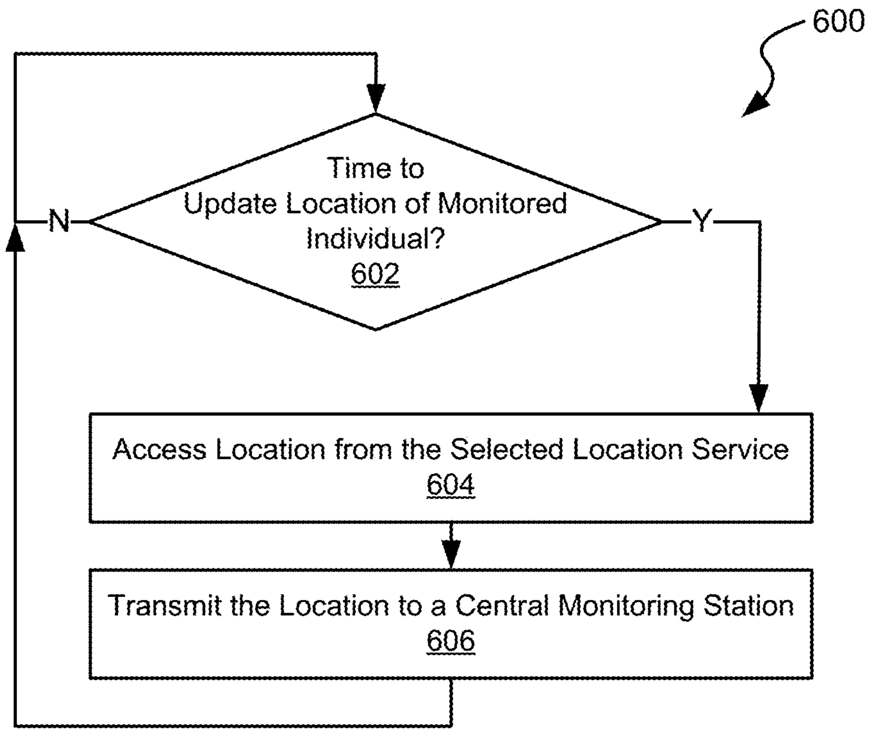
FIG. 6 is a flow diagram showing a method for reporting location of a monitored individual that may be used in relation to various embodiments.

Turning to FIG. 6, a flow diagram 600 shows a method in accordance with some embodiments for reporting location information of a monitored individual. As shown, the processes of FIG. 6 may be performed: (a) by user attached monitor device 110 operating in a system that does not include a user detached monitor device, (b) by user detached monitor device 210 operating in a system that does not include a user attached monitor device, and/or (c) by hybrid monitoring system 330. Where it is performed in hybrid monitoring system 330, all of the functions may be performed in user attached monitor device 310, in user detached monitor device 320; or a part of the functions may be performed in user attached monitor device 310 and another part of the functions may be performed in user detached monitor device 320.

Following flow diagram 600, it is determined whether it is time to update the location of the monitored individual (block 602). As an example, a monitor device (e.g., user attached monitor device 110, user detached monitor device 210, user attached monitor device 310, and/or user detached monitor device 320) may include a continuous timer and an instruction which causes the process of reporting location at certain time intervals (e.g., every ten minutes). Based upon the disclosure provided herein, one of ordinary skill in the art will recognize a variety of time intervals and/or circuitry that may be used in relation to different embodiments to determine the completion of such time intervals. Further, based upon the disclosure provided herein, one of ordinary skill in the art will recognize other approaches for indicating it is time to update location including, but not limited to, receiving a location update message from a central monitoring station.

Where it is time to update location of the monitored individual (block 602), location information is accessed from the selected location service (block 604) and transmitted to a central monitoring station (block 606). In some embodiments, there is a single location in memory designated to store the current location information which is used by all of the location determination services, and in such embodiments accessing the location information from the selected location service is as simple as reading the designated location in the memory. In such embodiments, it may be desirable to turn off all location determination services that have not been selected to ensure that only location information from the selected location determination service is stored to the designated location in the memory. Based upon the disclosure provided herein, one of ordinary skill in the art will recognize other approaches for accessing the location information from the selected location service in accordance with different embodiments.

Figure 7:
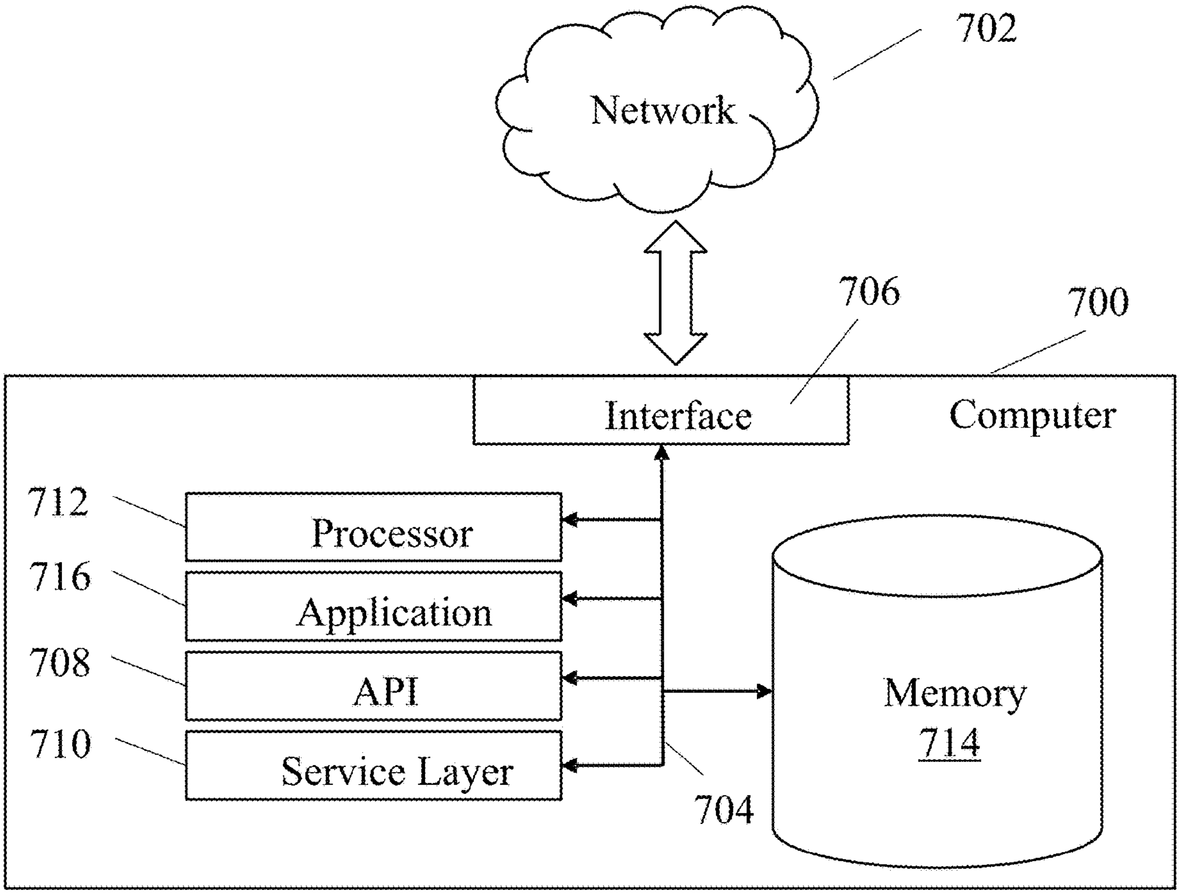
FIG. 7 shows an example processing system that may be used in relation to various embodiments.

Elements, such as, but not limited to, user attached monitor device 110, user detached monitor device 210, third-party location monitoring system 170, user interaction system 185, central monitoring station 160, third-party location monitoring system 270, user interaction system 285, central monitoring station 260, third-party location monitoring system 370, user interaction system 385, and/or central monitoring station 360 may be implemented on a computer system. FIG. 7 is a block diagram of a computer system 700 used to provide computational functionalities associated with described algorithms, methods, functions, processes, flows, and procedures as described in the instant disclosure, according to an implementation. Computer system 700 is one example of a large number of computer systems that may be used to implement different embodiments. Based upon the disclosure provided herein, one of ordinary skill in the art will recognize a wide variety of computer systems that may be used in relation to different embodiments.

Computer system 700 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, computer system 700 may include a computer that includes an input device, such as a keypad, keyboard, touch screen, or other device that can accept user information, and an output device that conveys information associated with the operation of computer system 700, including digital data, visual, or audio information (or a combination of information), or a GUI.

Computer system 700 can serve in a role as a client, network component, a server, a database or other persistency, or any other component (or a combination of roles) of a computer system for performing the subject matter described in the instant disclosure. Computer system 700 is communicably coupled with a network 702. In some implementations, one or more components of computer system 700 may be configured to operate within environments, including cloud-computing-based, local, global, or other environment (or a combination of environments).

At a high level, computer system 700 is an electronic computing device operable to receive, transmit, process, store, or manage data and information associated with the described subject matter. According to some implementations, computer system 700 may also include or be communicably coupled with an application server, e-mail server, web server, caching server, streaming data server, business intelligence (BI) server, or other server (or a combination of servers).

Computer system 700 can receive requests over network 702 from a client application (for example, executing on another computer system (not shown) and responding to the received requests by processing the said requests in an appropriate software application. In addition, requests may also be sent to computer system 700 from internal users (for example, from a command console or by other appropriate access method), external or third-parties, other automated applications, as well as any other appropriate entities, individuals, systems, or computers.

Each of the components of computer system 700 can communicate using a system bus 704. In some implementations, any or all of the components of the computer system 700, both hardware or software (or a combination of hardware and software), may interface with each other or interface 706 (or a combination of both) over system bus 704 using an application programming interface (API) 708 or a service layer 710 (or a combination of API 708 and service layer 710. API 708 may include specifications for routines, data structures, and object classes. API 708 may be either computer-language independent or dependent and refer to a complete interface, a single function, or even a set of APIs. Service layer 710 provides software services to computer system 700 or other components (whether or not illustrated) that are communicably coupled to computer system 700. The functionality of computer system 700 may be accessible for all service consumers using this service layer. Software services, such as those provided by service layer 710, provide reusable, defined business functionalities through a defined interface. For example, the interface may be software written in JAVA, C++, or other suitable language providing data in extensible markup language (XML) format or other suitable format. While illustrated as an integrated component of computer system 700, alternative implementations may illustrate API 708 or service layer 710 as stand-alone components in relation to other components of computer system 700 or other components (whether or not illustrated) that are communicably coupled to computer system 700. Moreover, any or all parts of API 708 or service layer 710 may be implemented as child or sub-modules of another software module, enterprise application, or hardware module without departing from the scope of this disclosure.

Computer system 700 includes an interface 706. Although illustrated as a single interface 706 in FIG. 11, two or more interfaces 706 may be used according to particular needs, desires, or particular implementations of computer system 700. Interface 706 is used by computer system 700 for communicating with other systems in a distributed environment that are connected to the network 702. Generally, the interface 706 includes logic encoded in software or hardware (or a combination of software and hardware) and operable to communicate with the network 702. More specifically, the interface 706 may include software supporting one or more communication protocols associated with communications such that the network 702 or interface's hardware is operable to communicate physical signals within and outside of the illustrated computer system 700.

Computer system 700 includes at least one computer processor 712. Although illustrated as a single computer processor 712 in FIG. 11, two or more processors may be used according to particular needs, desires, or particular implementations of computer system 700. Generally, the computer processor 712 executes instructions and manipulates data to perform the operations of computer system 700 and any algorithms, methods, functions, processes, flows, and procedures as described in the instant disclosure.

Computer system 700 also includes a memory 714 that holds data for computer system 700 or other components (or a combination of both) that may be connected to the network 702. For example, memory 714 may be a database storing data consistent with this disclosure. Although illustrated as a single memory 714 in FIG. 11, two or more memories may be used according to particular needs, desires, or particular implementations of computer system 700 and the described functionality. While memory 714 is illustrated as an integral component of computer system 700, in alternative implementations, memory 714 may be external to computer system 700.

In addition to holding data, the memory may be a non-transitory medium storing computer readable instruction capable of execution by computer processor 712 and having the functionality for carrying out manipulation of the data including mathematical computations.

Application 716 is an algorithmic software engine providing functionality according to particular needs, desires, or particular implementations of computer system 700, particularly with respect to functionality described in this disclosure. For example, application 716 can serve as one or more components, modules, applications, etc. Further, although illustrated as a single application 716, application 716 may be implemented as multiple applications 716 on computer system 700. In addition, although illustrated as integral to computer system 700, in alternative implementations, application 716 may be external to computer system 700.

There may be any number of computers 700 associated with, or external to, a computer system containing computer system 700, each computer system 700 communicating over network 702. Further, the term "client," "user," and other appropriate terminology may be used interchangeably as appropriate without departing from the scope of this disclosure. Moreover, this disclosure contemplates that many users may use one computer system 700, or that one user may use multiple computers 700.

In some embodiments, computer system 700 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

In conclusion, the present invention provides for novel systems, devices, and methods for providing location information for a tracking device. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for selecting a location source for tracking a monitored individual, the method comprising:

identifying, by a processing resource, a plurality of location determination services supported by an individual monitoring system, wherein the individual monitoring system includes at least one of a user attached monitor device and a user detached monitor device, and wherein the plurality of location determination services include at least two of: a satellite location determination service of the user attached monitor device, a satellite location determination service of the user detached monitor device, a beacon based location determination service of the user attached monitor device, a cell tower based location determination service of the user attached monitor device, a cell tower based location determination service of the user detached monitor device, a non-associated device based location determination service of the user attached monitor device, and a non-associated device based location determination service of the user detached monitor device; and selecting, by the processing resource, one of the plurality of location determination services based at least in part upon a combination of two or more of: a location of the user attached monitor device, a location of the user detached monitor device, a power status of the user attached monitor device, a power status of the user detached monitor device; a cost of the satellite location determination service of the user attached monitor device, a cost of the satellite location determination service of the user detached monitor device, a cost of the beacon based location determination service of the user attached monitor device, a cost of the cell tower based location determination service of the user attached monitor device, a cost of the cell tower based location determination service of the user detached monitor device, a cost of the non-associated device based location determination service of the user attached monitor device, a cost of the non-associated device based location determination service of the user detached monitor device, an accuracy of the satellite location determination service of the user attached monitor device, an accuracy of the satellite location determination service of the user detached monitor device, an accuracy of the beacon based location determination service of the user attached monitor device, an accuracy of the cell tower based location determination service of the user attached monitor device, an accuracy of the cell tower based location determination service of the user detached monitor device, an accuracy of the non-associated device based location determination service of the user attached monitor device, and an accuracy of the non-associated device based location determination service of the user detached monitor device;

receiving location information from the selected one of the plurality of location determination services; and reporting the location information to a central monitoring station via a wireless communication link.

2. The method of claim 1, wherein selecting the one of the plurality of location determination services comprises: generating, by the processing resource, a combination value, wherein the combination value is selected from a group consisting of: a weighted product of the cost of the satellite location determination service of the user attached monitor device and the accuracy of the satellite location determination service of the user attached monitor device, a weighted product of the cost of the satellite location determination service of the user detached monitor device and the accuracy of the satellite location determination service of the user detached monitor device, a weighted product of the cost of the beacon based location determination service of the user attached monitor device and the accuracy of the beacon based location determination service of the user attached monitor device, a weighted product of the cost of the cell tower based location determination service of the user attached monitor device and the accuracy of the cell tower based location determination service of the user attached monitor device, a weighted product of the cost of the cell tower based location determination service of the user detached monitor device and the accuracy of the cell tower based location determination service of the user detached monitor device, a weighted product of the cost of the non-associated device based location determination service of the user attached monitor device and the accuracy of non-associated device based location determination service of the user attached monitor device, and a weighted product of the cost of the non-associated device based location determination service of the user detached monitor device and the accuracy of non-associated device based location determination service of the user detached monitor device.

3. The method of claim 1, wherein the processing resource is included in one of: the user attached monitor device or the user detached monitor device.

4. The method of claim 1, wherein the plurality of location determination services include at least two of: the satellite location determination service of the user attached monitor device, the beacon based location determination service of the user attached monitor device, the cell tower based location determination service of the user attached monitor device, and the non-associated device based location determination service of the user attached monitor device.

5. The method of claim 1, wherein the plurality of location determination services include at least three of: the satellite location determination service of the user attached monitor device, the beacon based location determination service of the user attached monitor device, the cell tower based location determination service of the user attached monitor device, and the non-associated device based location determination service of the user attached monitor device.

6. The method of claim 1, wherein the plurality of location determination services include at least two of: the satellite location determination service of the user detached monitor device, the cell tower based location determination service of the user detached monitor device, and the non-associated device based location determination service of the user detached monitor device.

7. The method of claim 1, wherein the plurality of location determination services include all of: the satellite location determination service of the user detached monitor device, the cell tower based location determination service of the user detached monitor device, and the non-associated device based location determination service of the user detached monitor device.

8. The method of claim 1, the method further comprising:

determining, by the processing resource, that both the user attached monitor device and the user detached monitor device are available.

9. The method of claim 8, the method further comprising:

determining, by the processing resource, that the power status of the user attached monitor device is below a defined threshold; and selecting, by the processing resource, one of the plurality of location determination services based at least in part upon a combination of two or more of: the location of the user detached monitor device, the cost of the satellite location determination service of the user detached monitor device, the cost of the cell tower based location determination service of the user detached monitor device, the cost of the non-associated device based location determination service of the user detached monitor device, the accuracy of the satellite location determination service of the user detached monitor device, the accuracy of the cell tower based location determination service of the user detached monitor device, and the accuracy of the non-associated device based location determination service of the user detached monitor device.

10. The method of claim 8, the method further comprising:

determining, by the processing resource, that the power status of the user detached monitor device is below a defined threshold; and selecting, by the processing resource, one of the plurality of location determination services based at least in part upon a combination of two or more of: the location of the user attached monitor device, the cost of the satellite location determination service of the user attached monitor device, the cost of the beacon based location determination service of the user attached monitor device, the cost of the cell tower based location determination service of the user attached monitor device, the cost of the non-associated device based location determination service of the user attached monitor device, the accuracy of the satellite location determination service of the user attached monitor device, the accuracy of the beacon based location determination service of the user attached monitor device, the accuracy of the cell tower based location determination service of the user attached monitor device, and the accuracy of the non-associated device based location determination service of the user attached monitor device.

11. The method of claim 8, the method further comprising:

determining, by the processing resource, that the power status of the user attached monitor device is below a first defined threshold and the power status of the user detached monitor device is below a second defined threshold; and selecting, by the processing resource, one of the plurality of location determination services based at least in part upon a combination of two or more of: the location of the user attached monitor device, the location of the user detached monitor device, the cost of the satellite location determination service of the user attached monitor device, the cost of the satellite location determination service of the user detached monitor device, the cost of the beacon based location determination service of the user attached monitor device, the cost of the cell tower based location determination service of the user attached monitor device, the cost of the cell tower based location determination service of the user detached monitor device, the cost of the non-associated device based location determination service of the user attached monitor device, the cost of the non-associated device based location determination service of the user detached monitor device, the accuracy of the satellite location determination service of the user attached monitor device, the accuracy of the satellite location determination service of the user detached monitor device, the accuracy of the beacon based location determination service of the user attached monitor device, the accuracy of the cell tower based location determination service of the user attached monitor device, the accuracy of the cell tower based location determination service of the user detached monitor device, the accuracy of the non-associated device based location determination service of the user attached monitor device, and the accuracy of the non-associated device based location determination service of the user detached monitor device.

12. The method of claim 11, wherein the first defined threshold and the second defined threshold are the same percentage of remaining power.

13. The method of claim 1, wherein the individual monitoring system includes only the user attached monitor device, wherein the plurality of location determination services include at least two of: the satellite location determination service of the user attached monitor device, the beacon based location determination service of the user attached monitor device, the cell tower based location determination service of the user attached monitor device, and the non-associated device based location determination service of the user attached monitor device.

14. The method of claim 1, wherein the individual monitoring system includes only the user detached monitor device, wherein the plurality of location determination services include at least two of: the satellite location determination service of the user detached monitor device, the cell tower based location determination service of the user detached monitor device, and the non-associated device based location determination service of the user detached monitor device.

15. The method of claim 1, the method further comprising:

repeatedly selecting the one of the plurality of location determination services without human intervention.

16. The method of claim 15, wherein: the repeatedly selecting is done at a user programmable interval.

17. The method of claim 15, wherein: the repeatedly selecting is done based at least in part on a change in location of at least one of the user attached monitor device and the user detached monitor device.

18. A monitoring system, the monitoring system comprising:

a user attached monitor device configured to support a plurality of location determination services, wherein the plurality of location determination services comprises two or more of: a satellite location determination service of the user attached monitor device, a beacon based location determination service of the user attached monitor device, a cell tower based location determination service of the user attached monitor device, or a non-associated device based location determination service of the user attached monitor device;

wherein the user attached monitor device comprises a processor communicably coupled to a computer readable medium, and wherein the computer readable medium has stored therein, instructions which, when executed by the processor, cause the processor to:

select one of the plurality of location determination services based at least in part upon a combination of two or more of: a location of the user attached monitor device, a location of a user detached monitor device, a power status of the user attached monitor device, a power status of a user detached monitor device; a cost of the satellite location determination service of the user attached monitor device, a cost of the satellite location determination service of a user detached monitor device, a cost of the beacon based location determination service of the user attached monitor device, a cost of the cell tower based location determination service of the user attached monitor device, a cost of the cell tower based location determination service of a user detached monitor device, a cost of the non-associated device based location determination service of the user attached monitor device, a cost of the non-associated device based location determination service of a user detached monitor device, an accuracy of the satellite location determination service of the user attached monitor device, an accuracy of the satellite location determination service of a user detached monitor device, an accuracy of the beacon based location determination service of the user attached monitor device, an accuracy of the cell tower based location determination service of the user attached monitor device, an accuracy of the cell tower based location determination service of a user detached monitor device, an accuracy of the non-associated device based location determination service of the user attached monitor device, and an accuracy of the non-associated device based location determination service of a user detached monitor device;

receive location information from the selected one of the plurality of location determination services; and report the location information to a central monitoring station via a wireless communication link.

19. The monitoring system of claim 18, wherein the plurality of location determination service is a first plurality of location determination services, the monitoring system further comprising:

a user detached monitor device configured to support a second plurality of location determination services, wherein the second plurality of location determination services comprises at least one of: the satellite location determination service of the user detached monitor device, the cell tower based location determination service of the user detached monitor device, or the non-associated device based location determination service of the user detached monitor device.

20. The monitoring system of claim 19, wherein the processor is a first processor and the computer readable medium is a first computer readable medium, wherein the user detached monitor device comprises:

a second processor communicably coupled to a second computer readable medium, and wherein the second computer readable medium has stored therein, instructions which, when executed by the second processor, cause the second processor to:

select one of the second plurality of location determination services based at least in part upon a combination of two or more of: the location of the user attached monitor device, the location of the user detached monitor device, the power status of the user attached monitor device, the power status of the user detached monitor device; the cost of the satellite location determination service of the user attached monitor device, the cost of the satellite location determination service of the user detached monitor device, the cost of the beacon based location determination service of the user attached monitor device, the cost of the cell tower based location determination service of the user attached monitor device, the cost of the cell tower based location determination service of the user detached monitor device, the cost of the non-associated device based location determination service of the user attached monitor device, the cost of the non-associated device based location determination service of the user detached monitor device, the accuracy of the satellite location determination service of the user attached monitor device, the accuracy of the satellite location determination service of the user detached monitor device, the accuracy of the beacon based location determination service of the user attached monitor device, the accuracy of the cell tower based location determination service of the user attached monitor device, the accuracy of the cell tower based location determination service of the user detached monitor device the accuracy of the non-associated device based location determination service of the user attached monitor device, and the accuracy of the non-associated device based location determination service of the user detached monitor device;

receive location information from the selected one of the plurality of location determination services; and report the location information to a central monitoring station via the wireless communication link.

* * * * *